(12) United States Patent
Deb et al.

(10) Patent No.: US 9,619,917 B2
(45) Date of Patent: Apr. 11, 2017

(54) DEPTH OF FIELD FOR A CAMERA IN A MEDIA-EDITING APPLICATION

(75) Inventors: Sidhartha Deb, Santa Monica, CA (US); Gregory B. Abbas, Los Angeles, CA (US); Gregory Niles, Culver City, CA (US); Stephen Sheeler, Santa Monica, CA (US); Guido Hucking, Los Angeles, CA (US)

(73) Assignee: APPLE INC., Cupertino, CA (US)

( * ) Notice: Subject to any disclaimer, the term of this patent is extended or adjusted under 35 U.S.C. 154(b) by 1982 days.

(21) Appl. No.: 12/245,698

(22) Filed: Oct. 3, 2008

(65) Prior Publication Data

US 2010/0085351 A1    Apr. 8, 2010

(51) Int. Cl.
*G06T 15/00* (2011.01)

(52) U.S. Cl.
CPC .................. *G06T 15/00* (2013.01)

(58) Field of Classification Search
CPC ..... G06T 19/006; G06T 11/001; G06T 15/20; G06T 17/20; G06T 7/004; G06F 2203/04806
See application file for complete search history.

(56) References Cited

U.S. PATENT DOCUMENTS

| | | |
|---|---|---|
| 5,625,660 A | 4/1997 | Tuy |
| 5,835,693 A | 11/1998 | Lynch et al. |
| 6,018,348 A | 1/2000 | Sprague |
| 6,072,497 A | 6/2000 | Lichtenbelt et al. |
| 6,169,550 B1 | 1/2001 | Jain |
| 6,346,938 B1 | 2/2002 | Chan et al. |
| 6,353,677 B1 | 3/2002 | Pfister et al. |
| 6,466,207 B1 | 10/2002 | Gortler et al. |
| 6,697,068 B2 | 2/2004 | Iizuka et al. |
| 6,990,230 B2 | 1/2006 | Piponi |
| 7,148,892 B2 | 12/2006 | Robertson et al. |

(Continued)

FOREIGN PATENT DOCUMENTS

| | | |
|---|---|---|
| EP | 0782104 | 7/1997 |
| EP | 1107188 | 6/2001 |
| EP | 1132123 | 9/2001 |

OTHER PUBLICATIONS

Shade, Jonathan, et al., "Layered Depth Images," Proceedings of the 25th Annual Conference on Computer Graphics and Interactive Techniques, Jul. 19-24, 1998, pp. 231-242, ACM, New York, New York, USA.

*Primary Examiner* — Gregory J Tryder
(74) *Attorney, Agent, or Firm* — Chia-Hsin Chu; Page Ponsford; DLA Piper LLP US

(57) ABSTRACT

Some embodiments provide a method that provides tools for defining a scene including media objects in a multi-dimensional space. The method provides a set of user interface tools for adjusting a region of focus for rendering the space from a particular location within a particular field of view. In some embodiments, the region of focus is a first region in the space within the particular field of view and the space further includes a second region outside of the region of focus within the particular field of view. In some embodiments, the method also provides a set of effects for applying to the second region but not the first region to visually indicate the first region as the region of focus within the space and the second region as a region outside of the region of focus within the space.

26 Claims, 30 Drawing Sheets

(56) References Cited

U.S. PATENT DOCUMENTS

| | | |
|---|---|---|
| 7,298,370 B1 | 11/2007 | Middler et al. |
| 7,428,482 B2 | 9/2008 | Clavadetscher |
| 7,782,317 B2 | 8/2010 | Middler |
| 7,814,436 B2 | 10/2010 | Schrag et al. |
| 8,089,479 B2 | 1/2012 | Deb et al. |
| 2003/0034968 A1 | 2/2003 | Abramov et al. |
| 2003/0235344 A1 | 12/2003 | Kang et al. |
| 2004/0125103 A1 | 7/2004 | Kaufman et al. |
| 2004/0219980 A1 | 11/2004 | Bassett et al. |
| 2005/0028111 A1 | 2/2005 | Schrag et al. |
| 2005/0219239 A1 | 10/2005 | Mashitani et al. |
| 2006/0205502 A1 | 9/2006 | Kaneshige et al. |
| 2007/0146360 A1* | 6/2007 | Clatworthy et al. .......... 345/419 |
| 2007/0279435 A1 | 12/2007 | Ng et al. |
| 2008/0072168 A1* | 3/2008 | Conway .............. G06F 3/04815 715/764 |
| 2008/0303746 A1 | 12/2008 | Schlottmann et al. |
| 2009/0226080 A1 | 9/2009 | Boyd et al. |
| 2009/0256837 A1 | 10/2009 | Deb et al. |
| 2010/0080448 A1* | 4/2010 | Tam et al. ..................... 382/154 |

\* cited by examiner

DEPTH OF FIELD FOR A CAMERA IN A MEDIA-EDITING APPLICATION

FIELD OF THE INVENTION

The invention is directed towards image and video rendering. Specifically, the invention is directed towards depth of field properties for cameras in applications that render images and/or videos.

BACKGROUND OF THE INVENTION

Digital graphic design, video editing, and media editing applications provide designers and artists with tools to create much of the media seen today through various media outlets (television, movies, Internet content, etc.). These tools allow designers the ability to generate, compose, composite, and animate images and videos in a virtual three-dimensional space.

A computer simulating the three-dimensional space is able to produce (i.e., render) an image of the space as seen from a particular point in the space, looking in a particular direction, with a particular field of view. Some applications define a virtual camera at the particular point that is oriented in the particular direction and has properties that define the particular field of view. Such a virtual camera can be moved around the three-dimensional space, re-oriented, and may have various other properties that can be adjusted. The virtual camera is a user-interface tool that collectively represents the set of properties that define the direction, angle of view, and other attributes for rendering a scene from a particular point of view in a particular direction.

Virtual cameras have generally been defined as having a particular focal plane, a distance at which objects will appear in focus when the view from the camera is rendered. However, users may desire the ability to move the apparent focal plane of the virtual camera closer to or further from the camera in the context of a scene laid out in a three-dimensional space within an application. Users may also want to be able to render in focus a range of distances and expand or contract this range within the context of a scene. Accordingly, there is a need in the art for virtual cameras with highly modifiable focal properties. Furthermore, there is a need for user interface tools to enable easy modification of these focal properties.

SUMMARY OF THE INVENTION

Some embodiments of the invention provide novel user interface tools for rendering a particular region in a media-editing application from a particular location, in a particular direction, within a particular field of view. The media-editing application of some embodiments provides a set of tools for a user to define a three-dimensional space that includes two- and three-dimensional media objects (e.g., images, text, video clips, and other such objects). This application further provides a set of user interface tools for viewing and controlling the focal properties for rendering a particular region within the created space from a particular location, in a particular direction, within a particular field of view.

This application further provides a user interface tool, referred to in the discussion below as a virtual camera, to represent the location, direction, etc. from which the space is rendered. The virtual camera of some embodiments has a region of focus that is a two-dimensional region (e.g., a plane) or three-dimensional region (e.g., a volume) within the region rendered by the virtual camera. In these embodiments, objects located in the region of focus are rendered in focus by the virtual camera while special effects (e.g., blurring effects, coloring effects, etc.) are applied to objects outside the region of focus but within the region rendered by the virtual camera.

Some embodiments provide novel tools for viewing and controlling focal properties of the virtual camera, which can render a region from a particular location, in a particular direction, within a particular field of view. In some embodiments, the modifiable focal properties include the size of the region of focus, its distance from the camera, and the amount of effects applied to objects not within the region of focus. Some embodiments display the region of focus within the three-dimensional space of the media-editing application, enabling a user to modify the region of focus of a virtual camera within the context of a scene rendered by the virtual camera.

Specific modifiable parameters in some embodiments are an aperture, a focus offset, a near focus, and a far focus. The aperture parameter of some embodiments enables a user to affect the extent to which special effects (e.g., blurring) are applied to objects not in the region of focus. The focus offset parameter of some embodiments allows a user to move the region of focus closer to or further from the virtual camera. The near focus and far focus parameters of some embodiments allow a user to modify the size of the region of focus such that objects are in focus at more than one distance. Some embodiments also allow modification of other focal properties.

Various embodiments provide various user interface tools, or combinations of user interface tools, for adjusting the depth of field parameters. Sliders are one example of a user interface tool for modifying the aperture, focus offset, near focus, and far focus, as well as other parameters. Another type of user interface tool is one that provides for direct numerical input of the parameters (e.g., as a number of pixels, a percentage, etc.), either in conjunction with sliders or separately. Some embodiments provide moveable planes within the three-dimensional space of the media-editing application representing the focus offset, near focus, and far focus.

In some embodiments, the planes that represent the focus offset, near focus, and far focus move whenever a user modifies the parameters with a slider, direct numerical input, or other user interface tool. In some embodiments, a user can select and drag the planes directly in order to modify the depth of field parameters. The planes have handles that are used for dragging the planes in some embodiments. Some embodiments provide only one of the described controls for modifying the depth of field parameters, while other embodiments provide more than one of the described controls, or other controls that are not mentioned.

Some embodiments enable a user to set the depth of field properties of a virtual camera to change over a determined duration. A user can input (via any of the methods described above) a starting set of depth of field properties and a finishing set of depth of field properties, as well as a duration (e.g., length of time, number of frames of video, etc.) over which the parameters will change. When the scene is rendered from the point of view of the virtual camera, the depth of field properties change over the determined duration, from the starting properties to the finishing properties.

Some embodiments enable a user to select a target object to be brought into focus over the set duration. The user, in some embodiments, can select the target object, the duration, and the method of transition (e.g., constant movement of region of focus, accelerated movement of region of focus, etc.). When the scene is rendered, the region of focus will move from an initial distance from the camera to the distance of the target object from the camera, such that the target object is in focus at the end of the set duration.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purpose of explanation. However, one of ordinary skill in the art will realize that the invention may be practiced without the use of these specific details.

I. Overview

Some embodiments of the invention provide novel user interface tools for rendering a particular region in a media-editing (e.g., compositing) application from a particular location, in a particular direction, within a particular field of view. The media-editing application of some embodiments provides a set of tools for a user to define a three-dimensional space that includes two- and three-dimensional media objects (e.g., images, text, video clips, and other such objects). This application further provides a user interface tool, referred to in the discussion below as a virtual camera, to represent the location, direction, etc. from which the space is rendered.

This application further provides a user interface tool, referred to in the discussion below as a virtual camera, to represent the location, direction, etc. from which the space is rendered. The virtual camera of some embodiments has a region of focus that is a two-dimensional region (e.g., a plane) or three-dimensional region (e.g., a volume) within the region rendered by the virtual camera. In these embodiments, objects located in the region of focus are rendered in focus by the virtual camera while special effects (e.g., blurring effects, coloring effects, etc.) are applied to objects outside the region of focus but within the region rendered by the virtual camera.

Some embodiments provide novel tools for viewing and controlling focal properties of the virtual camera, which can render a region from a particular location, in a particular direction, within a particular field of view. In some embodiments, the modifiable focal properties include the size of the region of focus, its distance from the camera, and the amount of effects applied to objects not within the region of focus. Some embodiments display the region of focus within the three-dimensional space of the media-editing application, enabling a user to modify the region of focus of a virtual camera within the context of a scene rendered by the virtual camera.

Specific modifiable depth of field parameters in some embodiments are an aperture, a focus offset, a near focus, and a far focus. The aperture parameter of some embodiments enables a user to affect the extent to which special effects (e.g., blurring) are applied to objects not in the region of focus. The focus offset parameter of some embodiments allows a user to move the region of focus closer to or further from the virtual camera. The near focus and far focus parameters of some embodiments allow a user to modify the size of the region of focus such that objects are in focus at more than one distance. Some embodiments also allow modification of other depth of field parameters.

Figure 1:
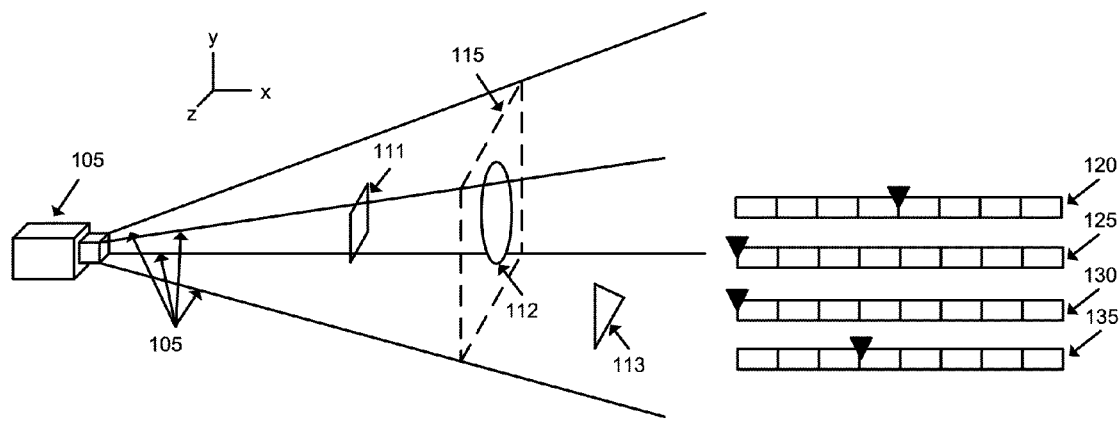
FIGS. 1-3 illustrate a simplified view of the modification of depth of field properties of a virtual camera of some embodiments.

Some embodiments provide a display area that displays a virtual camera, the field of view of the virtual camera, and any objects to be rendered by the virtual camera. Some such embodiments provide planes in the field of view that represent the focus offset, near focus, and far focus parameters. FIG. 1 illustrates a simplified view of a virtual camera 105 in a display area 100. Lines 110 represent the field of view of the virtual camera. Within the field of view 110 are objects 111, 112, and 113. Dashed lines 115 illustrate a plane showing the focal plane of virtual camera 105. When the scene shown in FIG. 1 is rendered from the virtual camera 105, object 112 will appear in focus, while blurring effects are applied to objects 111 and 113.

Various embodiments provide various user interface tools, or combinations of user interface tools, for adjusting the depth of field parameters. Sliders are one example of a user interface tool for modifying the aperture, focus offset, near focus, and far focus, as well as other parameters. Another type of user interface tool is one that provides for direct numerical input of the parameters (e.g., as a number of pixels, a percentage, etc.), either in conjunction with sliders or separately.

FIG. 1 also illustrates the sliders 120, 125, 130, and 135 of some embodiments used to modify depth of field parameters. In some embodiments, 120 is a slider for the focus offset, 125 is a slider for the near focus, 130 is a slider for the far focus, and 135 is a slider for the aperture. The focus offset can be positive or negative in some embodiments, and accordingly is set at zero when centered on the slider bar. In FIG. 1, the near focus and far focus parameters are set to zero, so the only plane that is in focus is at the focal plane 115. The aperture is set at approximately the three-eighths mark, indicating that objects not in focus will be blurred a non-zero amount. In some embodiments, setting the aperture slider 135 to zero results in no blurring at all.

In some embodiments, the planes mentioned above that represent the focus offset, near focus, and far focus move whenever a user modifies the parameters with a slider, direct numerical input, or other user interface tool. In some embodiments, a user can select and drag the planes directly in order to modify the depth of field parameters. The planes have handles that are used for dragging the planes in some embodiments. Some embodiments provide only one of the described controls for modifying the depth of field parameters, while other embodiments provide more than one of the described controls, or other controls that are not mentioned.

Figure 2:
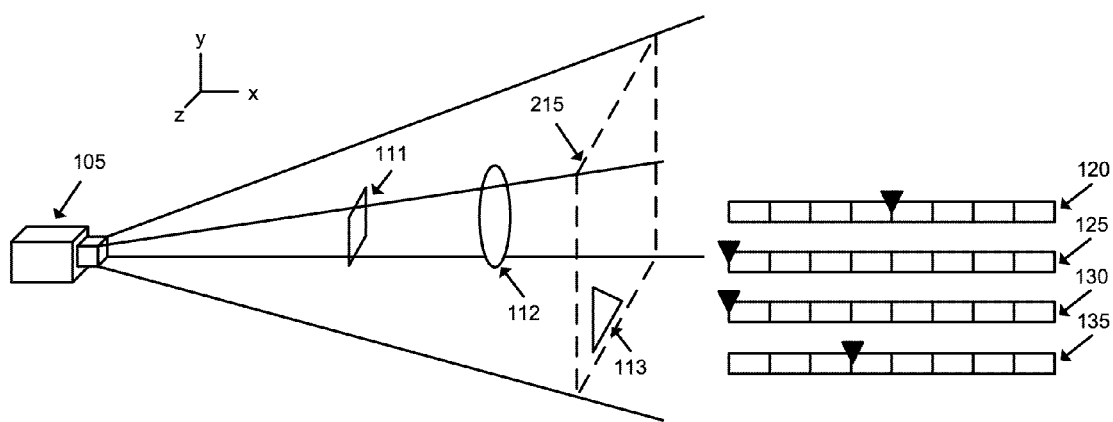

FIG. 2 illustrates the scene from FIG. 1 after a user has modified the focus offset with slider 120. Slider 120 has been moved to the right, which moves the apparent focal plane represented by dashed lines 215. When the scene shown in FIG. 2 is rendered from the virtual camera 105, object 113 will appear in focus, while blurring effects are applied to objects 111 and 112. In some embodiments, object 111 will be blurred more than object 112 because it is further from the apparent focal plane 215.

Figure 3:
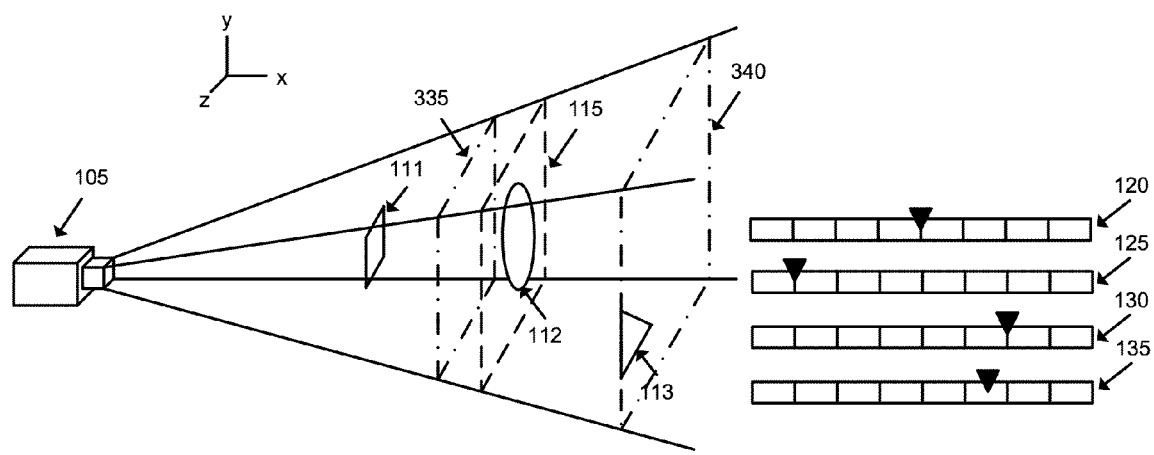

FIG. 3 illustrates the scene from FIG. 1 after a user has modified the near focus and far focus parameters with sliders 125 and 130, and the aperture parameter with slider 135. Slider 125 has been moved a small amount, which moves the near focus plane 335 a short distance to the left (closer to the camera). Slider 130 has been moved a larger amount, which moves the far focus plane substantially to the right (further from the camera). Furthermore, slider 135 has been moved a substantial amount, resulting in an increase in the aperture. When the scene shown in FIG. 3 is rendered from the virtual camera 105, objects 112 and 113 will both appear to be in focus, while blurring effects are applied to object 111. As a result of the increased aperture, object 111 will be rendered as blurrier than if the aperture had not been changed.

Some embodiments enable a user to set the depth of field properties of a virtual camera to change over a specific duration. A user can input (via any of the methods described above) a starting set of depth of field properties and a finishing set of depth of field properties, as well as a duration (e.g., length of time, number of frames of video, etc.) over which the parameters will change. When the scene is rendered from the point of view of the virtual camera, the depth of field properties change over the determined duration, from the starting properties to the finishing properties. For example, a user could set the parameters such that the focus offset would move from the distance shown in FIG. 1 to the distance shown in FIG. 2 over a set duration.

Some embodiments enable a user to select a target object to be brought into focus over the set duration. The user, in some embodiments, can select the target object, the duration, and the method of transition (e.g., constant movement of region of focus, accelerated movement of region of focus, etc.). When rendered, the region of focus will move from an initial distance from the camera to the distance of the target object from the camera, such that the target object is in focus at the end of the set duration.

II. Compositing Application

Figure 4:
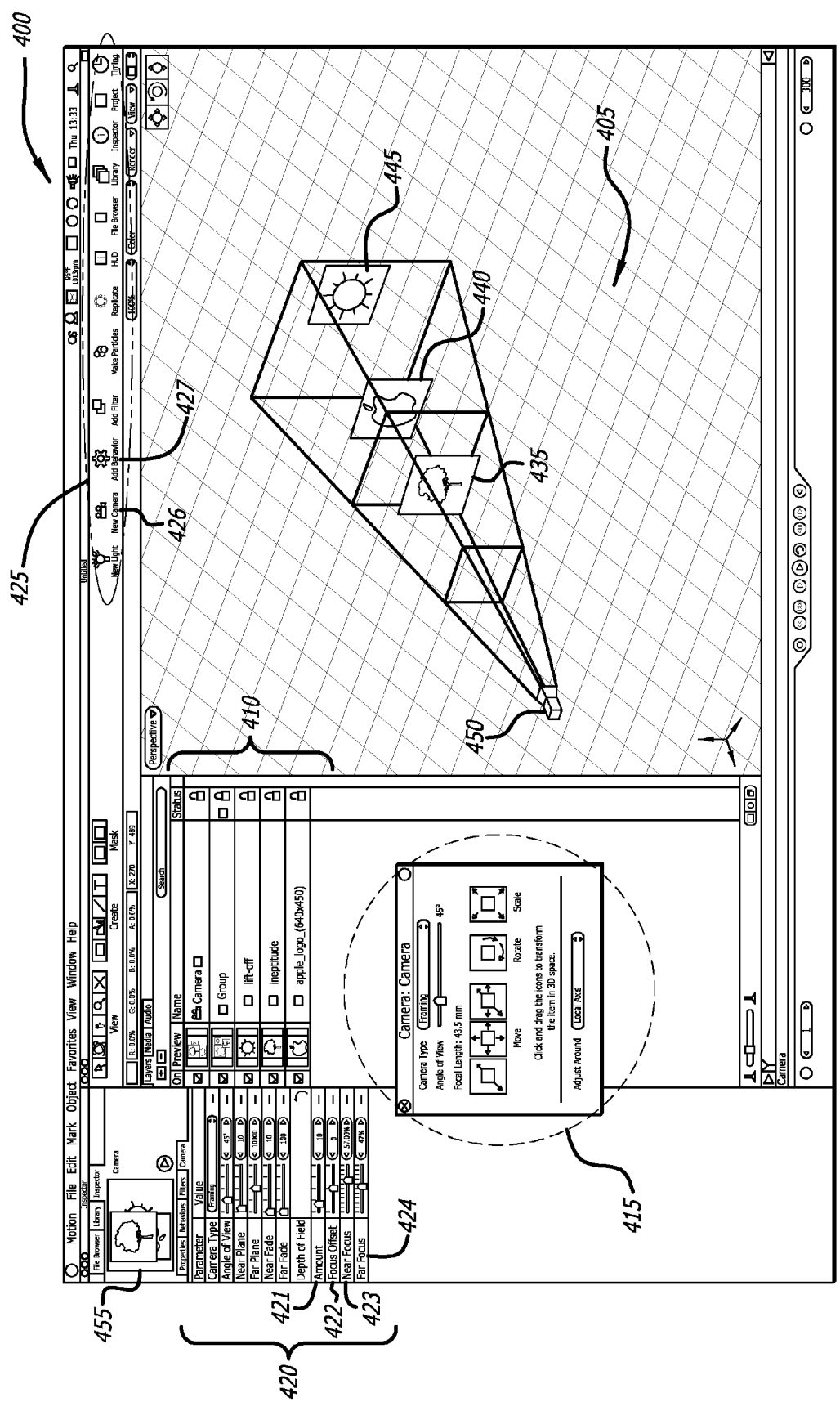
FIG. 4 illustrates a three-dimensional compositing application of some embodiments.

FIG. 4 illustrates a three-dimensional compositing application 400 provided by some embodiments. The compositing application 400 provides a primary display area 405, an object selection area 410, a first set of virtual camera controls 415, a second set of virtual camera controls 420, a preview display area 455, a set of control icons 425, and video rendering controls 430. Some embodiments provide other features, such as multiple timelines indicating different camera behaviors.

The primary display area 405 includes objects 435, 440, and 445, as well as camera 450. Each of the objects 435, 440, and 445 are in the field of view of camera 450. Each of the objects 435-445 has a corresponding entry in the object selection area 410, as does the camera 450. The primary display area 405 is displaying a perspective view of the scene in FIG. 4. In some embodiments, the primary display area can also display the view from camera 450 (or other cameras that have been defined). The primary display area 405 of some embodiments includes gridlines to assist a user in laying out a scene (e.g., to assist in determining the distance from an object to a virtual camera).

The first set of camera controls 415 provides controls for camera 450. These controls allow a user to define the camera type and modify the angle of view for camera 450, as well as controls to move and rotate the camera 450 within the scene shown in the display area 405. The first set of camera controls also displays the focal length of the camera (i.e., the focal distance, the distance from the camera at which, without the modification of any depth of field parameters, the camera will render objects in focus.

The second set of camera controls 420 also provides controls for camera 450. Some of the controls 420 provide the same abilities to a user as controls 415 (such as defining the camera type or modifying the angle of view). Furthermore, the second set of camera controls 420 allows a user to modify depth of field properties of the camera 450 with sliders and numerical input boxes 421-424. Sliders 421-424 will be described in greater detail in Section III below. Some embodiments use different user interface items for controls 420 rather than slider tools or direct numerical input.

Above the second set of camera controls 420 is a preview display 455 of some embodiments. The preview display 455 displays the view through the camera 450. As objects 435-445 are moved in the primary display area, or properties (e.g., depth of field parameters) of the camera 450 are changed, the appearance of the preview display 455 will change accordingly.

The set of control icons 425 includes numerous icons for performing various functions within the compositing application. The set of control icons 425 includes icon 426, which allows a user to define a new camera (e.g., camera 450). Icon 427 allows a user to define a new behavior for an object, camera, or other item. In some embodiments, a behavior is a change in some property (e.g., position, orientation, etc.) of a camera or object over a period of time. Some embodiments allow a user to set behaviors of a camera relating to the camera's depth of field (e.g., bringing an object into focus).

III. Depth of Field Rendering

Some embodiments allow users to modify the depth of field parameters of virtual cameras in a compositing application. Doing so enables the user to adjust how objects in the field of view of a virtual camera appear when rendered (i.e., how in focus or blurred an object appears when rendered). How an object appears when rendered by a virtual camera is affected by the focal distance of the virtual camera and how objects that are not at the focal distance of the camera are blurred.

Figure 5:
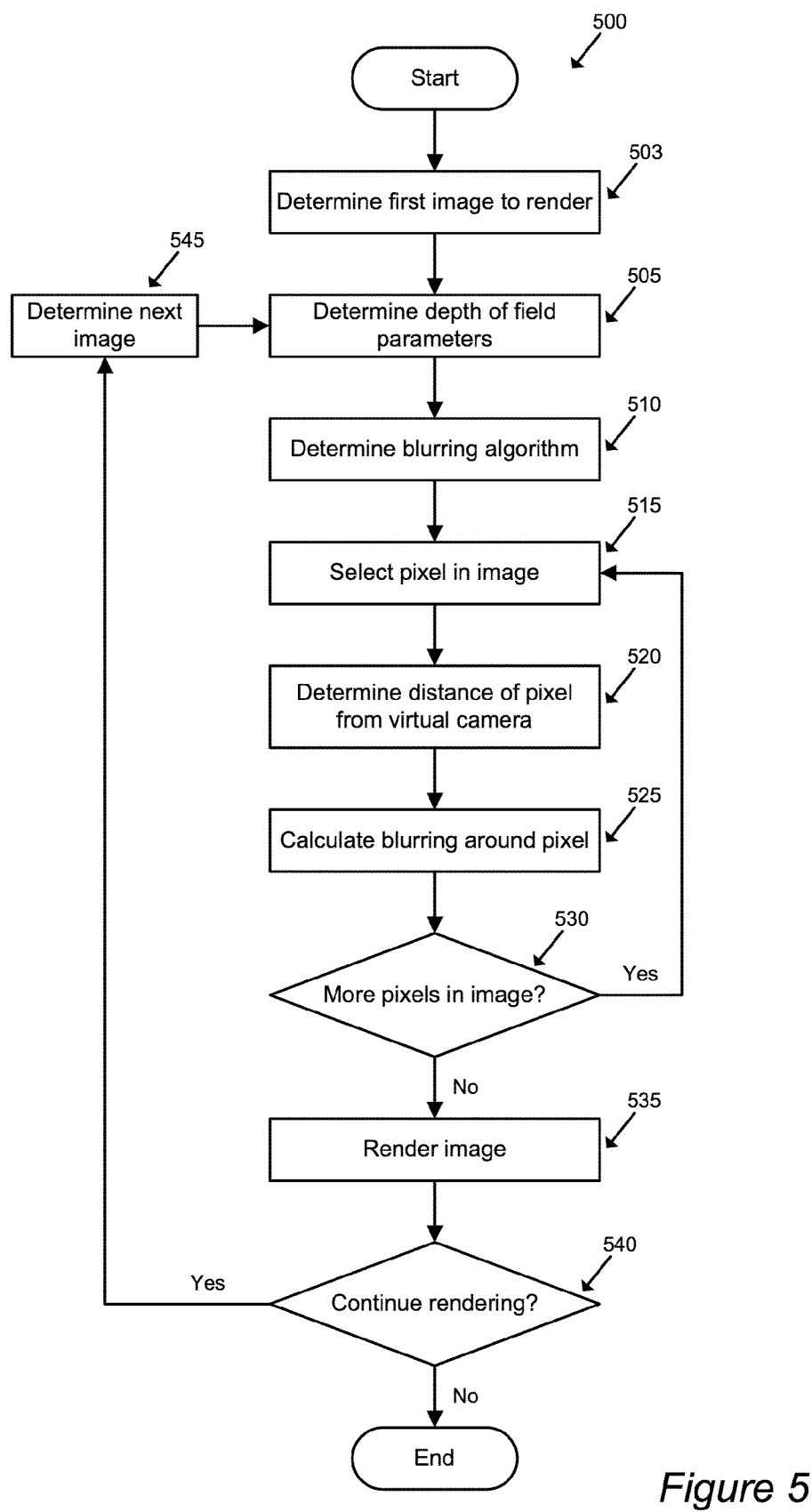
FIG. 5 conceptually illustrates a process 500 of some embodiments for rendering an image from a virtual camera.

FIG. 5 illustrates a process 500 of some embodiments for rendering images (e.g., frames of video) from a virtual camera. The process 500 begins by determining (at 503) a first image to render. In some embodiments, the first image is the first frame of a scene. Sometimes the first image is a frame that a user has selected to render first (e.g., by dragging an indicator on a timeline to a particular point in the timeline indicating a particular frame).

After determining the image to render, the process 500 determines (at 505) the depth of field parameters for the virtual camera. In some embodiments, the depth of field parameters are specific to the particular image being rendered. For example, the parameters may change throughout a scene of a video that includes of a number of images, and the parameters must be determined for each particular image. In some embodiments, the image may be rendered as the user edits the depth of field parameters (or other properties, such as the location or orientation of the virtual camera rendering the image). The depth of field parameters of some embodiments include the region of focus (i.e., the distance or distances at which objects will be rendered as in focus), and how the focus falls off for objects not at such distances. Such parameters are input by users through a variety of user interface tools in some embodiments.

Figure 6:
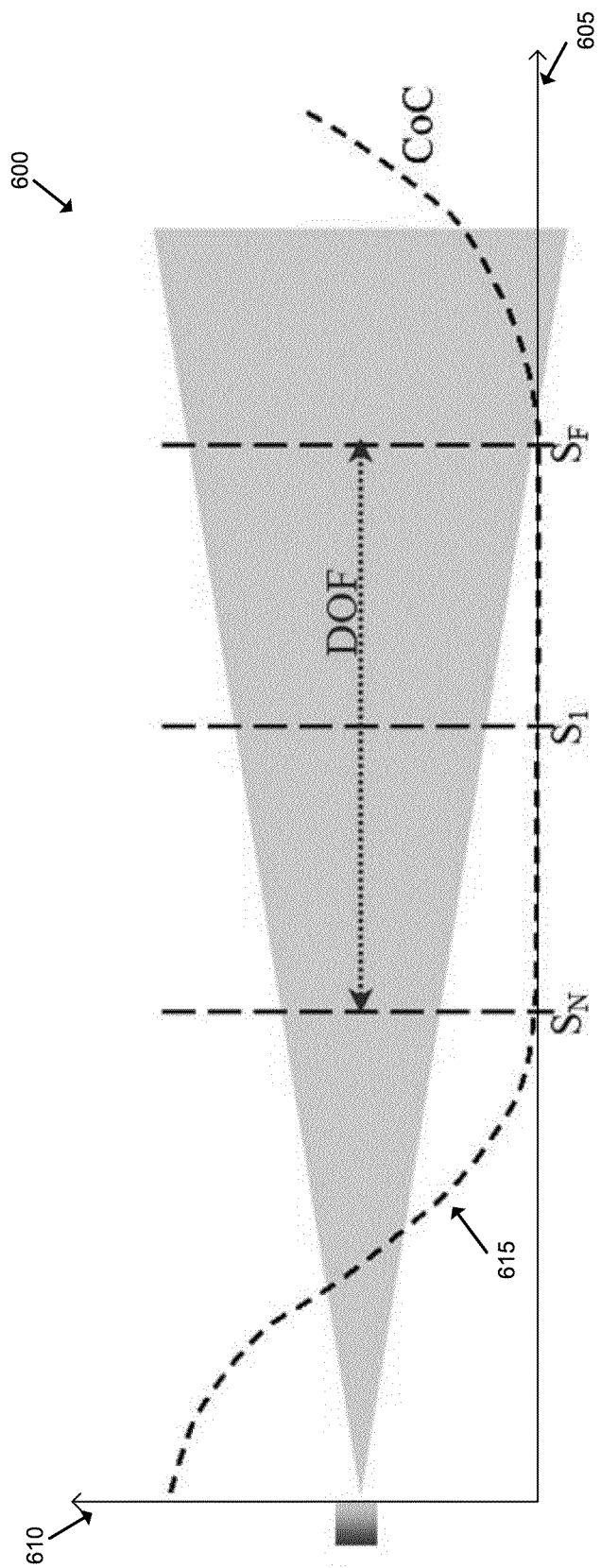
FIG. 6 illustrates a graph plotting the size of the circle of confusion against distance from a virtual camera of some embodiments.

In some embodiments, the determination of the depth of field parameters includes calculating the circle of confusion at all distances from the camera. The circle of confusion is the size that a point appears as when rendered. The compositing application of some embodiments, when rendering an image, displays each point as a disk, the size of which is dependent on how blurred the point is to appear. Points that are further from the apparent focal plane (i.e., the distance from the camera at which objects are rendered in focus) of the virtual camera will have a larger circle of confusion. FIG. 6 illustrates a graph 600. The graph 600 plots the size of the circle of confusion on axis 610 against the distance from the virtual camera on axis 605. Distances $S_N$ and $S_F$ represent the near and far ends of the range of distances in which objects will appear in focus. As objects at these distances are rendered as in focus, the circle of confusion (represented by dashed line 615) is zero from $S_N$ to $S_F$. The dashed line illustrates the manner in which the circle of confusion increases at distances not within the distances from $S_N$ to $S_F$. In some embodiments, a user can set parameters to affect the rate at which the circle of confusion grows as objects get further outside of the range in focus.

After determining the depth of field parameters, the process 500 determines (at 510) the blurring algorithm to be used. Some embodiments use an algorithm that applies a defocus filter to a disk the size of the circle of confusion. Some embodiments use algorithms that are less computationally intensive than a defocus disk, such as a Gaussian filter or other algorithms. In some embodiments, a user may select between different blurring algorithms for rendering an image.

The process 500 then selects (at 515) a pixel in the image to be rendered. Some embodiments start with a corner pixel, and traverse across an entire row of pixels before moving to a second row. Other embodiments start with a corner pixel, and traverse down an entire column before moving to a second column. Other embodiments use other algorithms for traversing through all the pixels in an image.

Once a pixel is selected, the process 500 determines (at 520) the distance of the pixel from the virtual camera. Each pixel effectively represents a ray emanating from the virtual camera at a particular angle (i.e., x degrees off of horizontal and y degrees off of vertical) or small range of angles. The distance at which the ray would first intersect an object is the distance of the pixel. The process 500 then calculates (at 525) the blurring around the pixel, based on the size of the circle of confusion at the pixel's distance and the blurring algorithm determined at 510.

The process 500 then determines (at 530) whether there are more pixels for which the distance and blurring have not been calculated. If no more pixels remain, the process 500 proceeds to 535 to render the image. If more pixels remain, the process returns to 515 and repeats 515 through 530 until all pixels for the current image have been selected.

After rendering the image, the process 500 determines (at 540) whether to continue rendering. If the process determines to continue rendering, the process moves to 545 to determine the next image. For example, if a user is playing back a scene, then the next frame in the scene is the next image. After determining the next image to render, the process moves to 505 and repeats 505 through 535 to render the new image.

If the process 500 determines (at 540) that no more images are to be rendered, the process ends. For example, if the most recently rendered image is the last frame in a video, the process would not have any further images to render. Also, a user could select a user interface item (e.g., a stop button) that would cause the process to stop rendering images.

A. User Interface Tools for Modifying Depth of Field Parameters

In some embodiments, the depth of field parameters of a virtual camera can be modified by one or more sets of user interface tools. As discussed above, the depth of field parameters affect the extent to which objects in the field of view of the virtual camera will appear in focus when rendered by the virtual camera.

Figure 7:
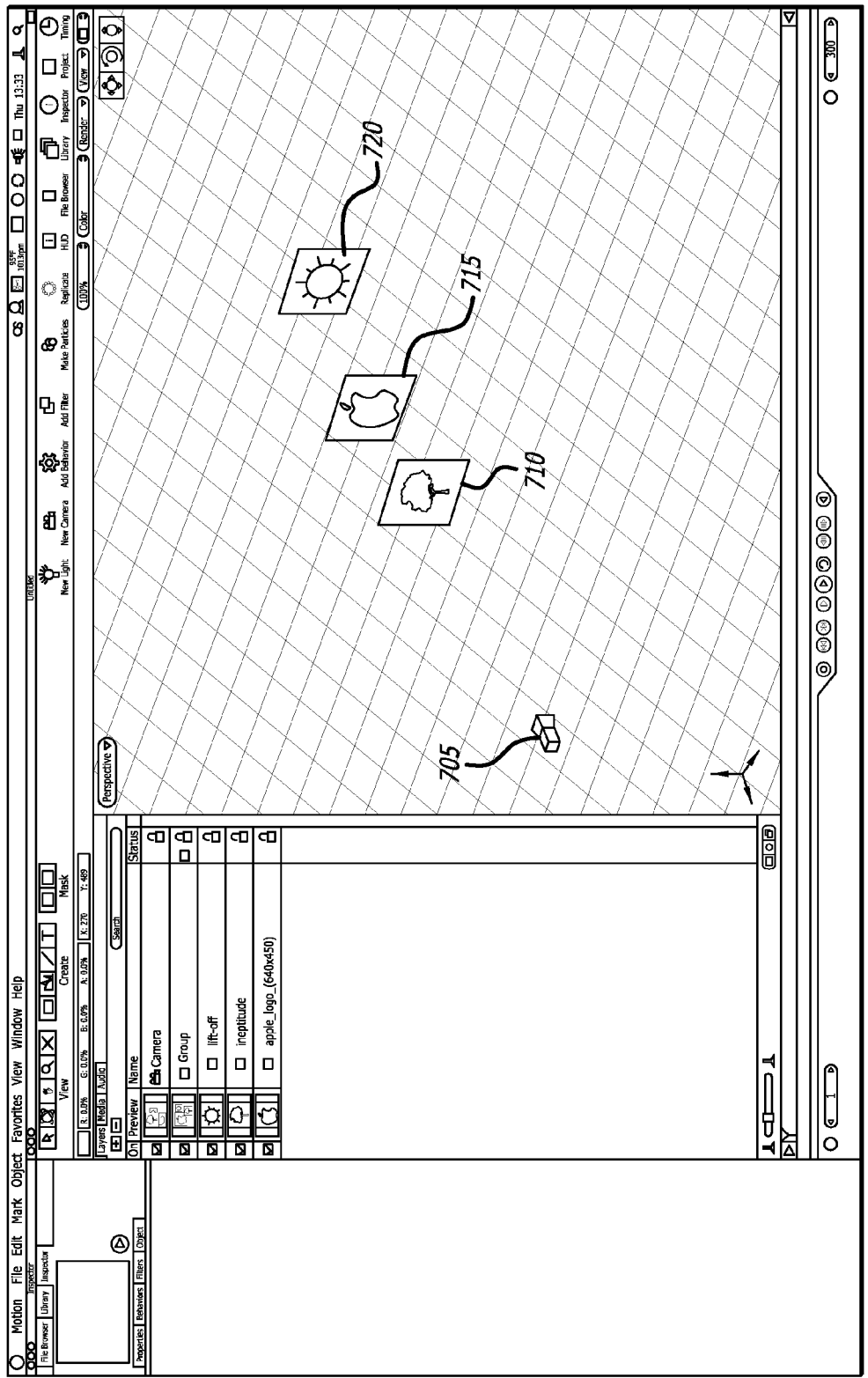
FIGS. 7-14B illustrate the modification of depth of field properties of a virtual camera via various user interface tools in a compositing application of some embodiments.

FIG. 7 illustrates a scene in a compositing application of some embodiments. FIG. 7 illustrates a virtual camera 705, and three objects 710, 715, and 720, at different distances from the virtual camera. The virtual camera 705 and the objects 710-720 are shown in a primary display area of the compositing application. The display area gives a perspective view of the scene and any virtual cameras that have been defined, such as camera 705.

Figure 8A:
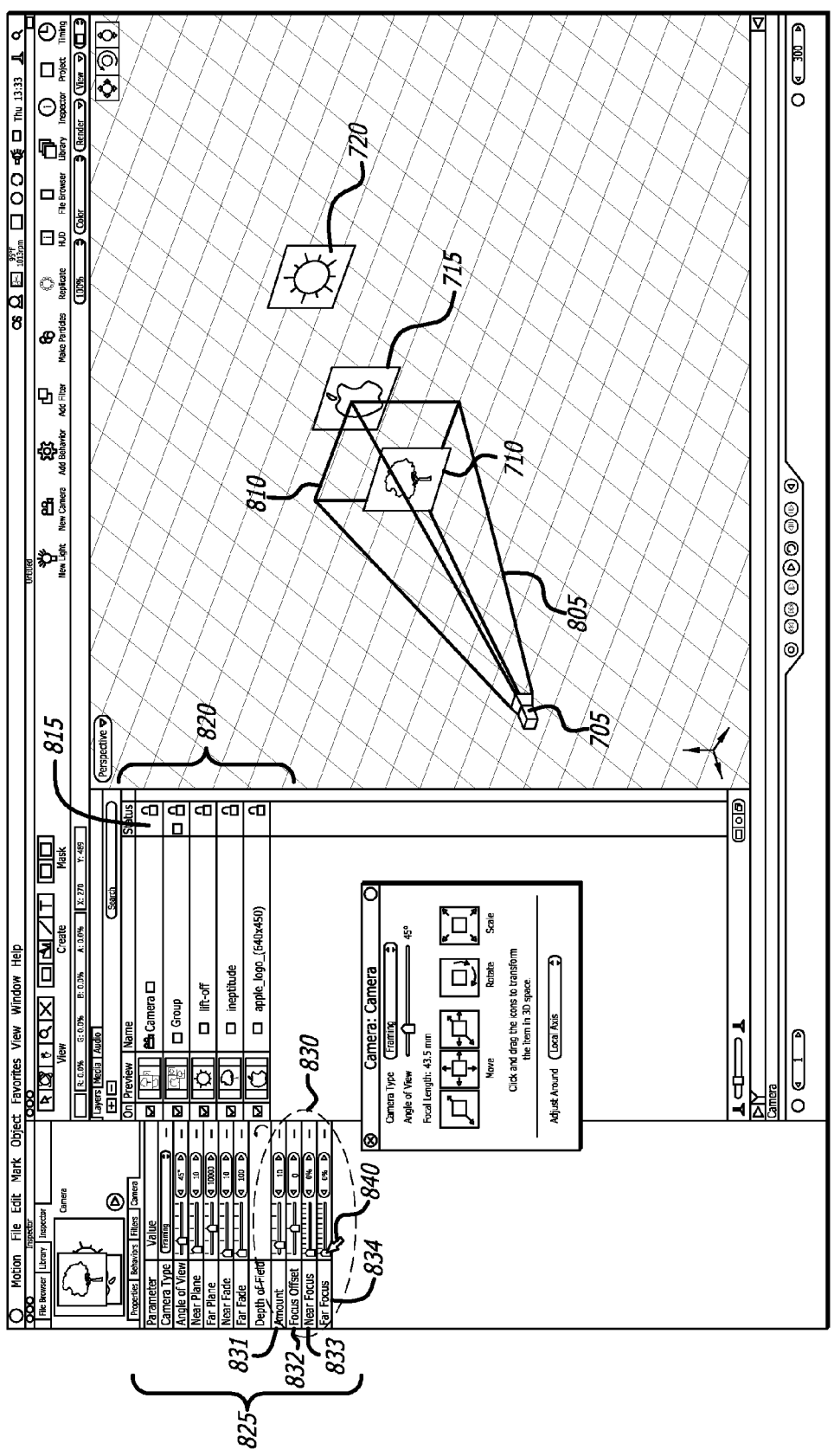

FIG. 8A illustrates the selection, by a user, of virtual camera 705. In some embodiments, a user selects a virtual camera by clicking on the virtual camera in the primary display area. In some embodiments, a user selects a virtual camera by clicking on the row for the camera in the object selection area 820. A user can perform either of these methods, or other methods (e.g., shortcut keys) to select a virtual camera in some embodiments. FIG. 8A illustrates that row 815, the row for camera 705, is highlighted, because camera 705 is selected.

The selection of a virtual camera also causes the display of viewing frustum 805. Viewing frustum 805 shows a user what is in the field of view of the virtual camera 705. Plane 810 illustrates the focal plane of the camera 705 (i.e., the plane at which objects will be rendered in focus). The focal plane is the entire region of focus at this point.

Figure 8B:

Selection of the virtual camera 705 also causes the display of camera controls 825 in some embodiments. The camera controls of some embodiments include depth of field controls 830. FIG. 8B illustrates an enlarged view of the depth of field controls 830 from FIG. 8A. The illustrated depth of field controls include four sliders 831, 832, 833, and 834. Slider 831 controls the aperture of the virtual camera, which is used in some embodiments to determine how quickly the circle of confusion increases as objects are located further away from the focal plane (i.e., how blurry objects not in focus will be).

Slider 832 controls the focus offset. In some embodiments, the focus offset measures the distance from the focal plane of the camera (i.e., the distance at which objects are rendered in focus in the absence of modification of the depth of field properties of the camera) to the apparent focal plane. In other words, the focus offset allows the user to modify the apparent focal plane of the virtual camera without modifying any other properties of the camera. Slider 833 controls the near focus plane. Moving slider 833 to the right causes the near focus plane to move closer to the camera. The near focus plane, in some embodiments, represents the start of the region of focus (i.e., the distance closest to the camera at which objects will be rendered as completely in focus). Slider 834 controls the far focus plane. Moving slider 834 to the right causes the far focus plane to move further from the camera. The far focus plane, in some embodiments, represents the end of the region of focus (i.e., the distance furthest from the camera at which objects will be rendered completely in focus).

In some embodiments (e.g., the depicted embodiments), next to each of the sliders 831-834 is a numerical input tool. Moving a slider will affect the corresponding number in some embodiments. Furthermore, in some embodiments, the number can be changed directly, either by typing the desired number or by selecting the right and left arrows on either side of the number to increase or decrease the number. Directly changing the number will cause the corresponding slider to move accordingly in some embodiments. Also, directly changing the number will, if appropriate, cause the focal plane, near focus plane, or far focus plane to move in the display area.

The number associated with slider 831 is a measurement, in some embodiments, of the aperture of the virtual camera. This measurement is given in millimeters in some embodiments. The focus offset measurement, associated with slider 832, is a distance in pixels from the focus offset in some embodiments. The focus offset is set to zero when the slider is centered (as in FIGS. 8A and 8B), and moving the offset to the left or right moves the apparent focal plane closer to or further from the camera, correspondingly.

For the near and far focus numerical measurements associated with sliders 833 and 834, some embodiments use percentages of the foreground and background. Some embodiments define the foreground as the area in the field of view between the near plane of the camera frustum and the apparent focal plane. Similarly, some embodiments define the background as the area in the field of view between the apparent focal plane and the far plane of the camera frustum. Thus, if the near focus slider is set to 0%, none of the area in front of the focal plane will be rendered in focus. If the near focus slider is set to 100%, the entire foreground will be rendered in focus. Similarly, if the far focus slider is set to 100%, the entire background will be rendered in focus.

Some embodiments use only one slider to move both the near and far focus sliders. In some embodiments, this slider measures a percentage of the background/foreground. Other embodiments use a single slider that directly measures a distance (e.g., in units such as pixels) the near and far focus planes should move, such that the two planes are always equidistant from the apparent focal plane. Similarly, some embodiments use two sliders, as is shown in FIGS. 8A and 8B, but measure distances (e.g., in pixels in relation to the apparent focal plane) rather than percentages. Some embodiments allow a user to choose which of the described sets of controls (or other control sets for controlling depth of field parameters) are provided by the compositing application.

Figure 9A:
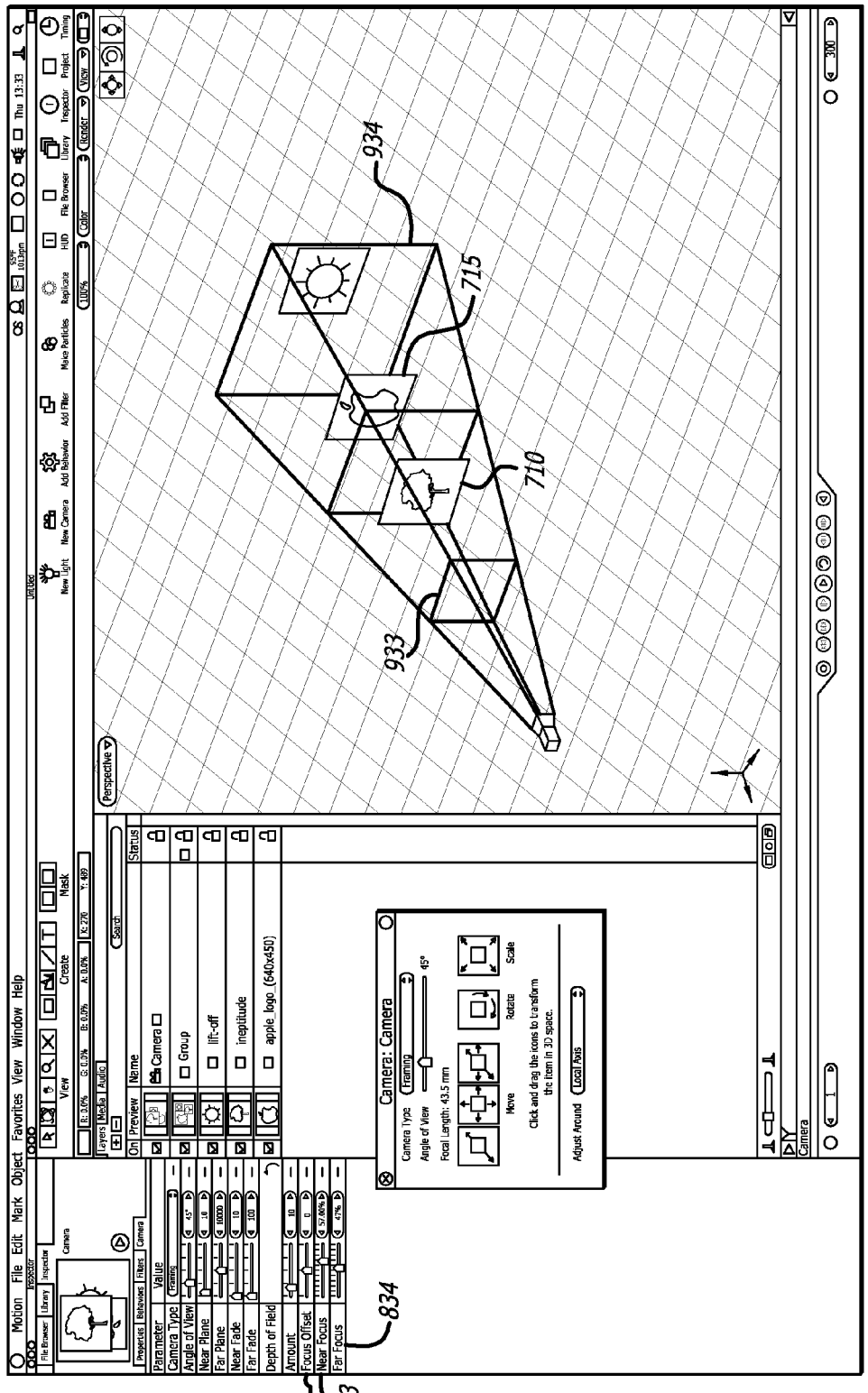
Figure 9B:
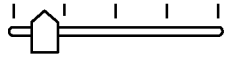

In FIG. 8A, cursor 840 is over the far focus slider. FIG. 9A illustrates the result of a user sliding the far focus slider to 47% with the cursor, as well as sliding the near focus slider to 57% (also using the cursor). FIG. 9B illustrates an enlarged view of the sliders from FIG. 9A. FIG. 9A illustrates the appearance of near focus plane 933 and far focus plane 934. The area between near focus plane 933 and far focus plane 934 (which includes objects 710 and 715) is the region of focus. Some embodiments display the objects as in or out of focus in the perspective view shown in the primary display area, whereas some embodiments save computational resources by only calculating the blurring of the objects upon rendering the scene from the virtual camera.

Figure 10:
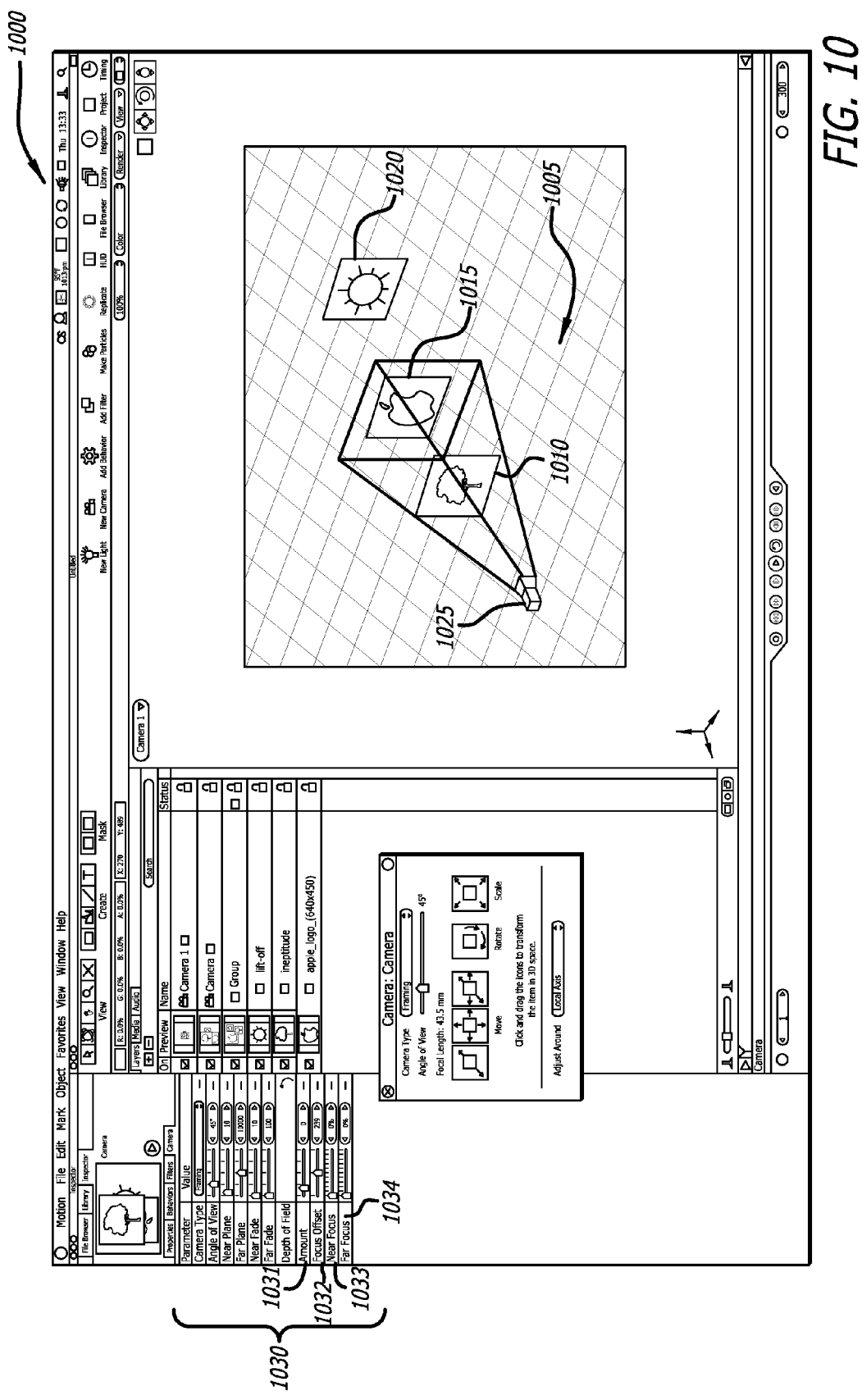

FIG. 10 illustrates a compositing application 1000 of some embodiments, with three objects 1010, 1015, and 1020, along with virtual camera 1025, in the display area 1005. The display area illustrates the objects from a different perspective than in FIGS. 7-9A The compositing application 1000 also includes a set of camera controls 1030, including depth of field sliders 1031 (aperture), 1032 (focus offset), 1033 (near focus), and 1034 (far focus).

Figure 11A:
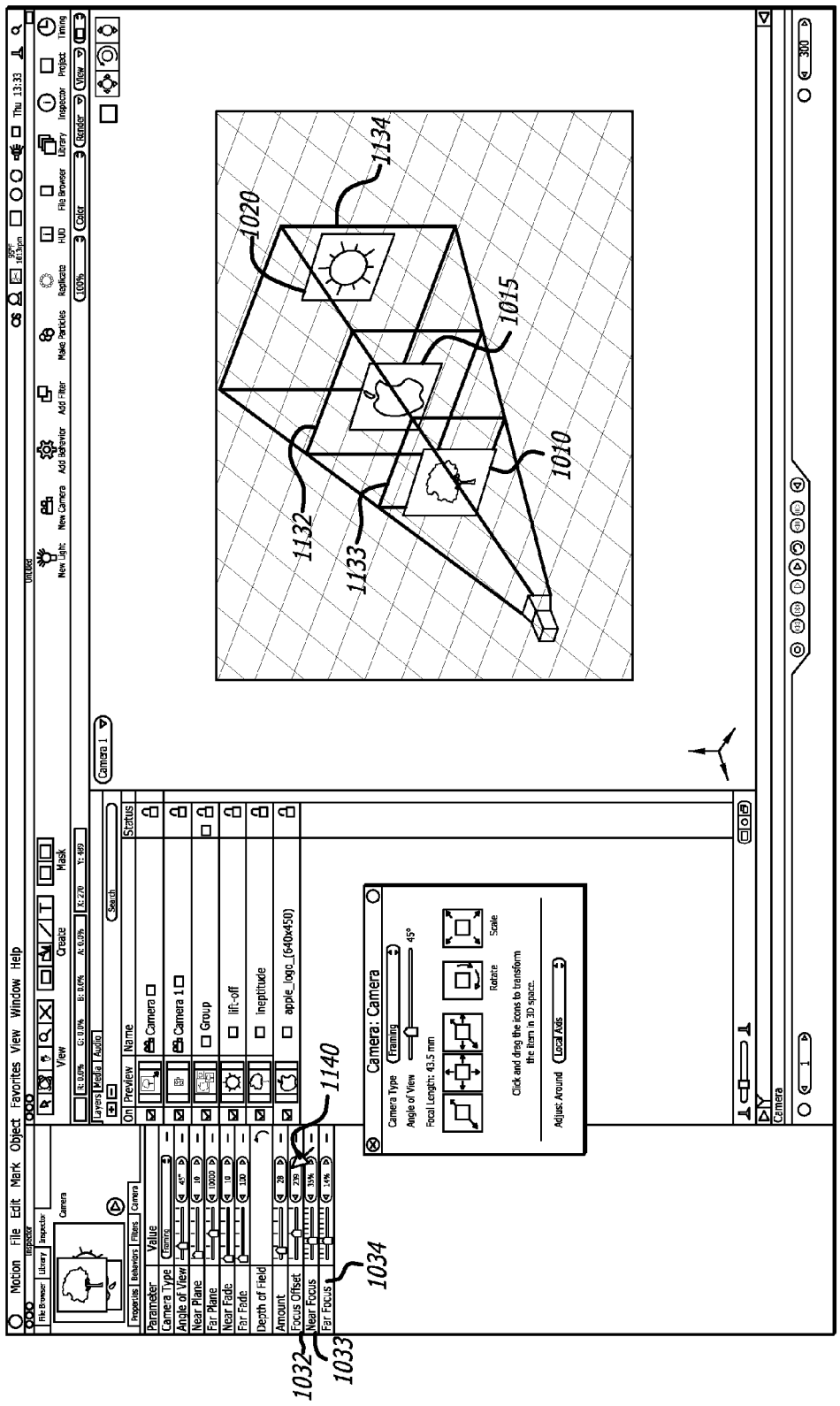
Figures 11B, 12B:
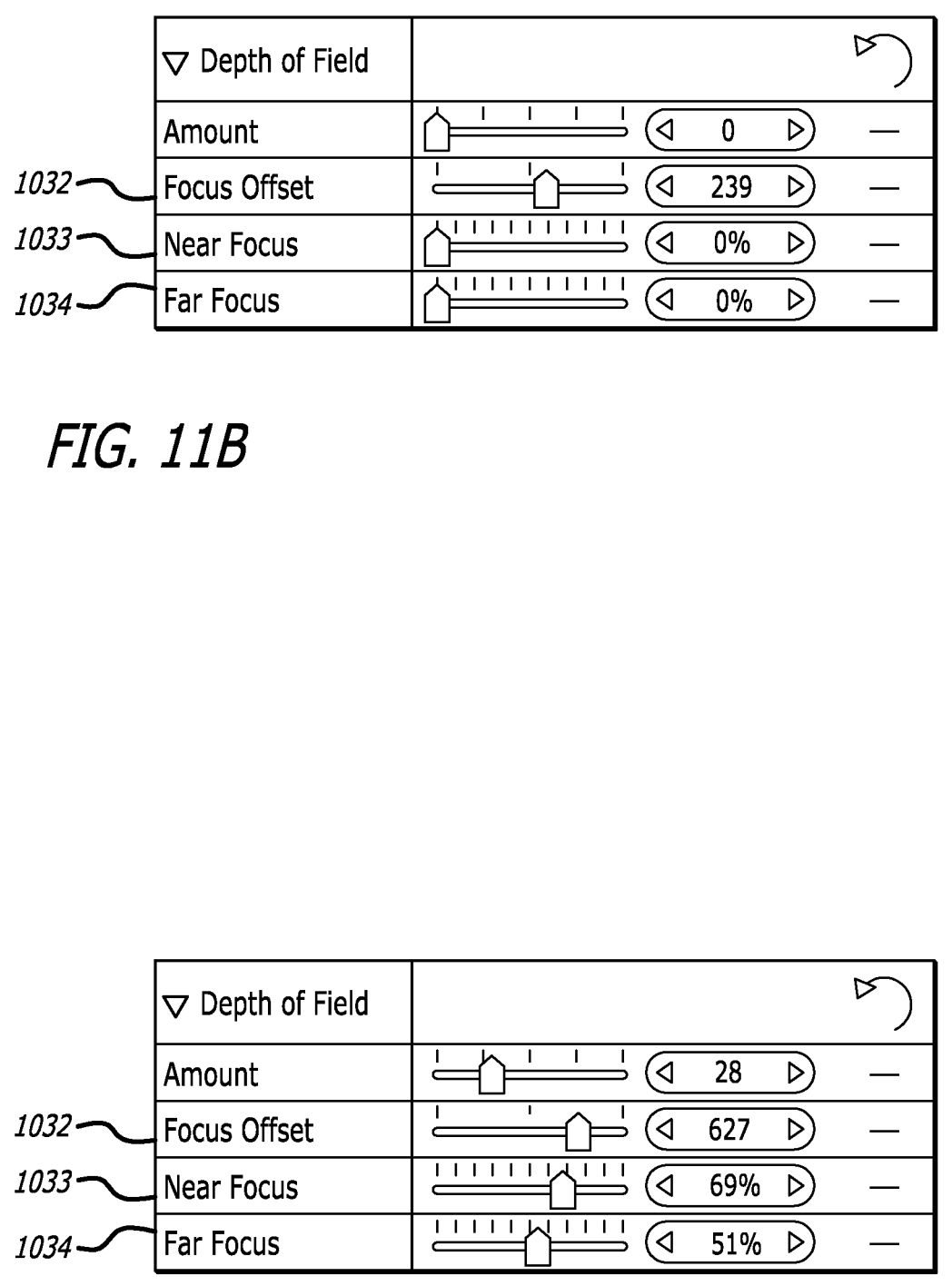

FIG. 11A illustrates the scene from FIG. 10 with the focus offset set to 239 (in units of pixels, though some embodiments use different units as mentioned above), the near focus set to 35% and the far focus set to 38% (in percentages, though some embodiments measure the near and far focus differently, as mentioned above). FIG. 11B illustrates an enlarged view of the sliders from FIG. 11A. Focus offset plane 1132, near focus plane 1133, and far focus plane 1134 have also appeared as the corresponding parameter values are set to nonzero numbers. In FIG. 11A, a cursor 1140 is over the right arrow on the numerical input for the focus offset slider. A user using a selection tool (e.g., a mouse button) with the cursor located over this arrow will increase the focus offset in some embodiments. Similarly, selecting the left arrow will decrease the focus offset.

Figure 12A:
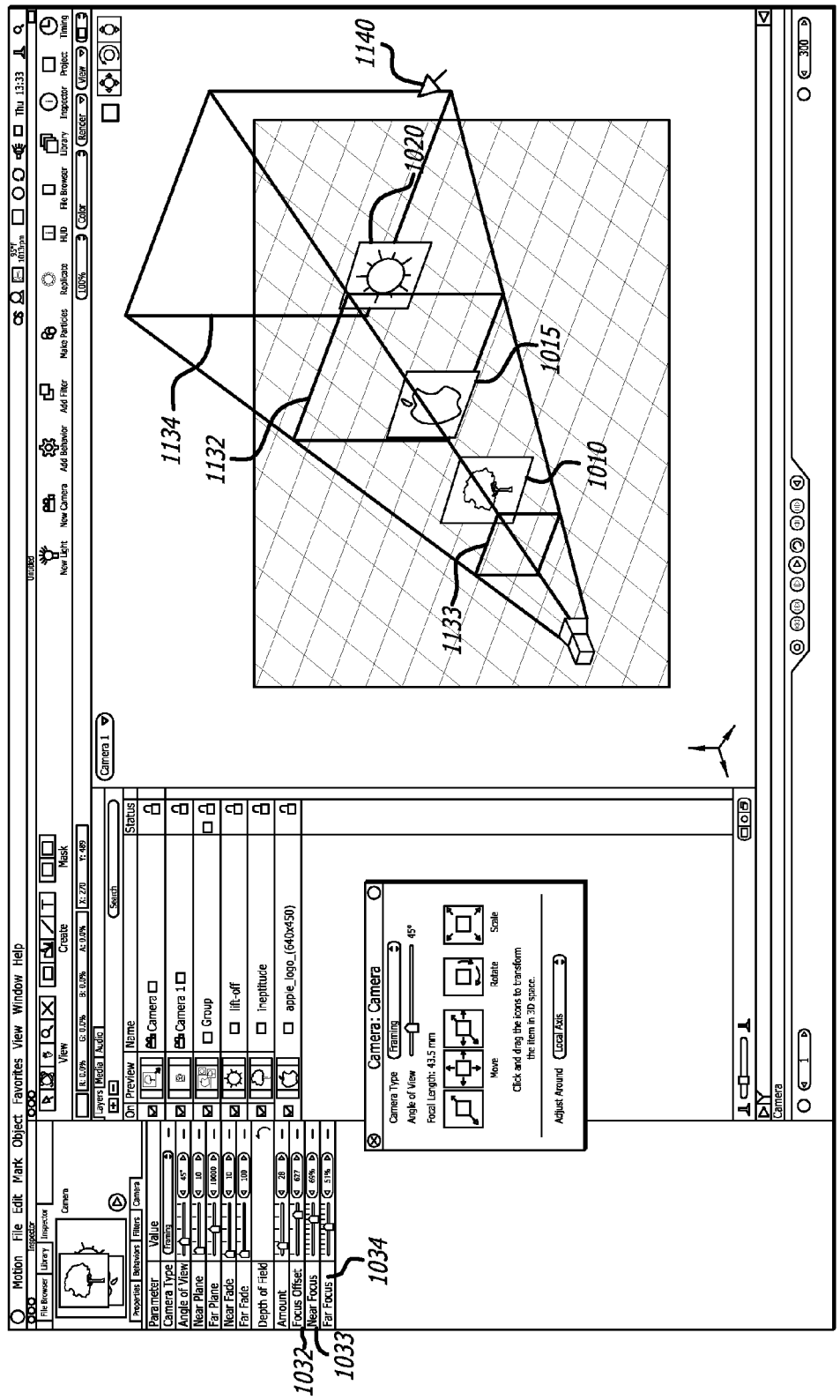

FIG. 12A illustrates the scene after the user has used the right arrow on the focus offset numerical input to increase the focus offset from 239 pixels to 627 pixels. Doing so has caused plane 1132 to move accordingly in the display area, and slider 1032 to move to the right. The user has also (via the slider, numerical input, or other method) increased both the near and far focus sliders. FIG. 12B illustrates an enlarged view of the sliders from FIG. 12A. Whereas in FIG. 11A, only object 1015 was within the range of focus, in FIG. 12A objects 1010, 1015, and 1020 are all within the range of focus, and thus would all be rendered in focus.

FIG. 12A also illustrates cursor 1140 over the edge of far focus plane 1134. In some embodiments, a user can drag a plane directly in order to change the depth of field parameter associated with that plane. In some embodiments, the planes can only be dragged within a particular range. For example, the near focus plane 1133 in some embodiments cannot be moved so that it is further from the virtual camera than the focus offset plane 1132. Similarly, the far focus plane 1134 in some embodiments cannot be moved so that it is closer to the virtual camera than the focus offset plane 1132.

In some embodiments, the focus offset plane 1132 can only be moved so that it stays in between the near and far focus planes 1133 and 1134. However, in other embodiments, the focus offset plane 1132 can be moved outside the range defined by the near and far focus planes 1133 and 1134. When the focus offset plane is moved even with either the near or far focus plane, the near or far focus plane disappears and the focus offset plane can continue to move in that direction. In some such embodiments, in which the near and far focus are defined by percentages, moving the focus offset plane causes the numerical percentages and sliders for the near and far focus planes to change such that the near and far focus planes remain static. In other embodiments that define the near and far focus planes with percentages, moving the focus offset plane causes the near and far focus planes to move such that the numerical percentages and sliders for the near and far focus planes remain static.

Figure 13A:
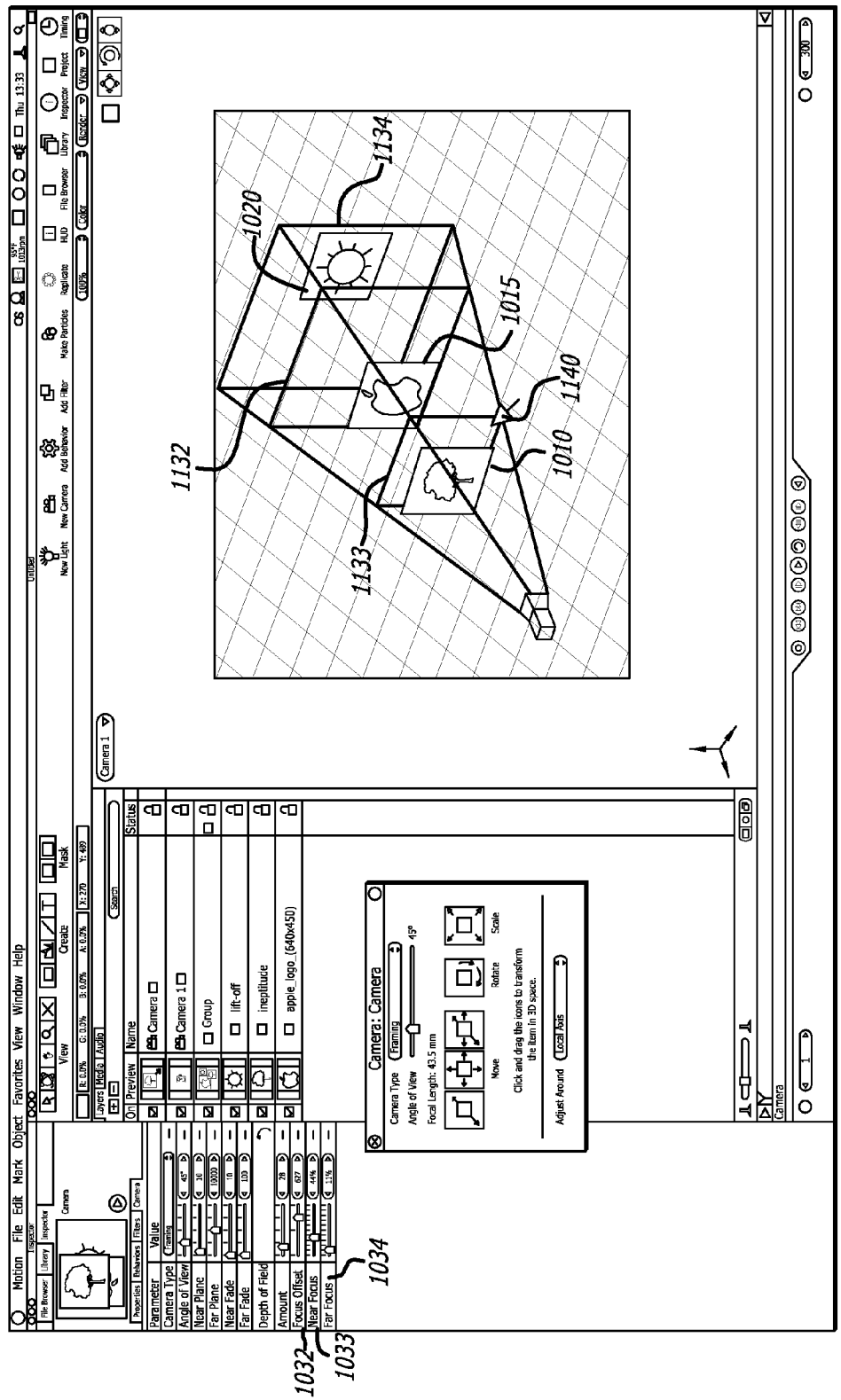
Figure 13B:

FIG. 13A illustrates that the far focus plane 1134 has been dragged by the user (using the cursor 1140) such that it is closer to the focus offset plane 1132 as compared with FIG. 12A. Doing so has caused the far focus slider 1034 to move and the numerical value for the far focus to change from 51% to 11%. FIG. 13B illustrates an enlarged view of the sliders. The user has also moved the near focus plane such that object 1010 is no longer in the range that will be rendered as in focus. In the depicted embodiment, the user could have moved the near focus plane 1133 by moving the slider 1033, by using the numerical input, or by dragging the near focus plane 1133 in the display area.

Figure 14A:
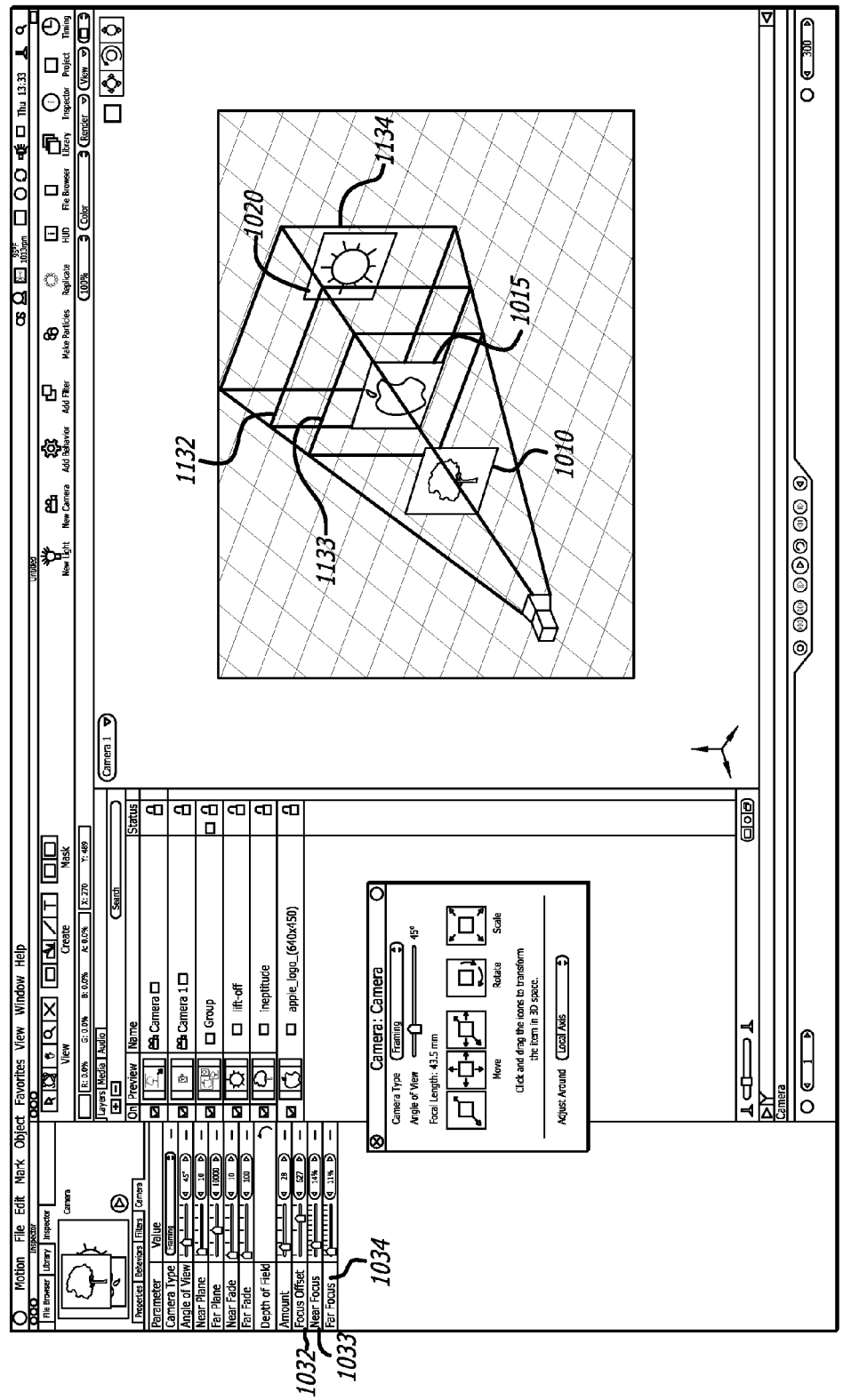
Figure 14B:

FIG. 13A also illustrates cursor 1140 over near focus plane 1133. FIG. 14A illustrates that the near focus plane 1133 has been moved by the user significantly closer to focal offset plane 1132. This has created a small range of focus that only encompasses object 1015 and not much else. Moving the near focus plane 1133 also has caused the slider 1033 to move and the near focus numerical value to change from 44% to 14%. FIG. 14B illustrates an enlarged view of the sliders.

Figure 15:
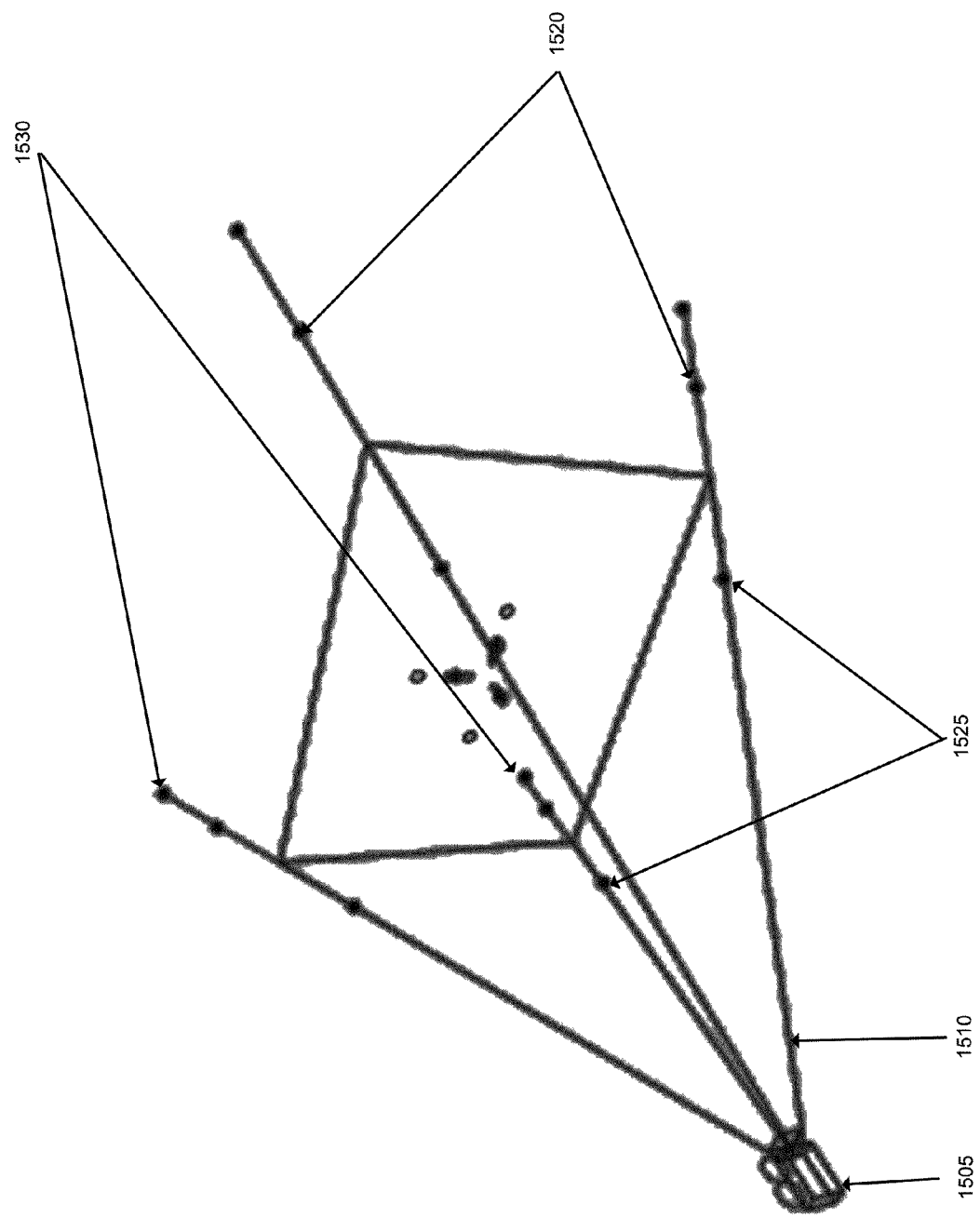
FIGS. 15-18 illustrate the use of handles along a camera frustum for modifying depth of field properties in some embodiments.

The compositing application of some embodiments, rather than displaying the focal offset, near focus, and far focus planes in the display area, displays handles along the camera frustum. FIG. 15 illustrates a virtual camera 1505 with camera frustum 1510 and focal plane 1515. Focal plane 1515 is the "physical" focal plane of the camera, representing the distance that would be in focus with no changes to the focus offset, near focus, or far focus parameters. FIG. 15 also illustrates three sets of handles along the camera frustum. These handles are used in some embodiments to display and move the focus offset (handles 1520), near focus (handles 1525), and far focus (handles 1530) planes, thereby affecting the depth of field for the virtual camera. For the sake of clarity, only two handles from each of the three sets are labeled in FIG. 15.

Figure 16:
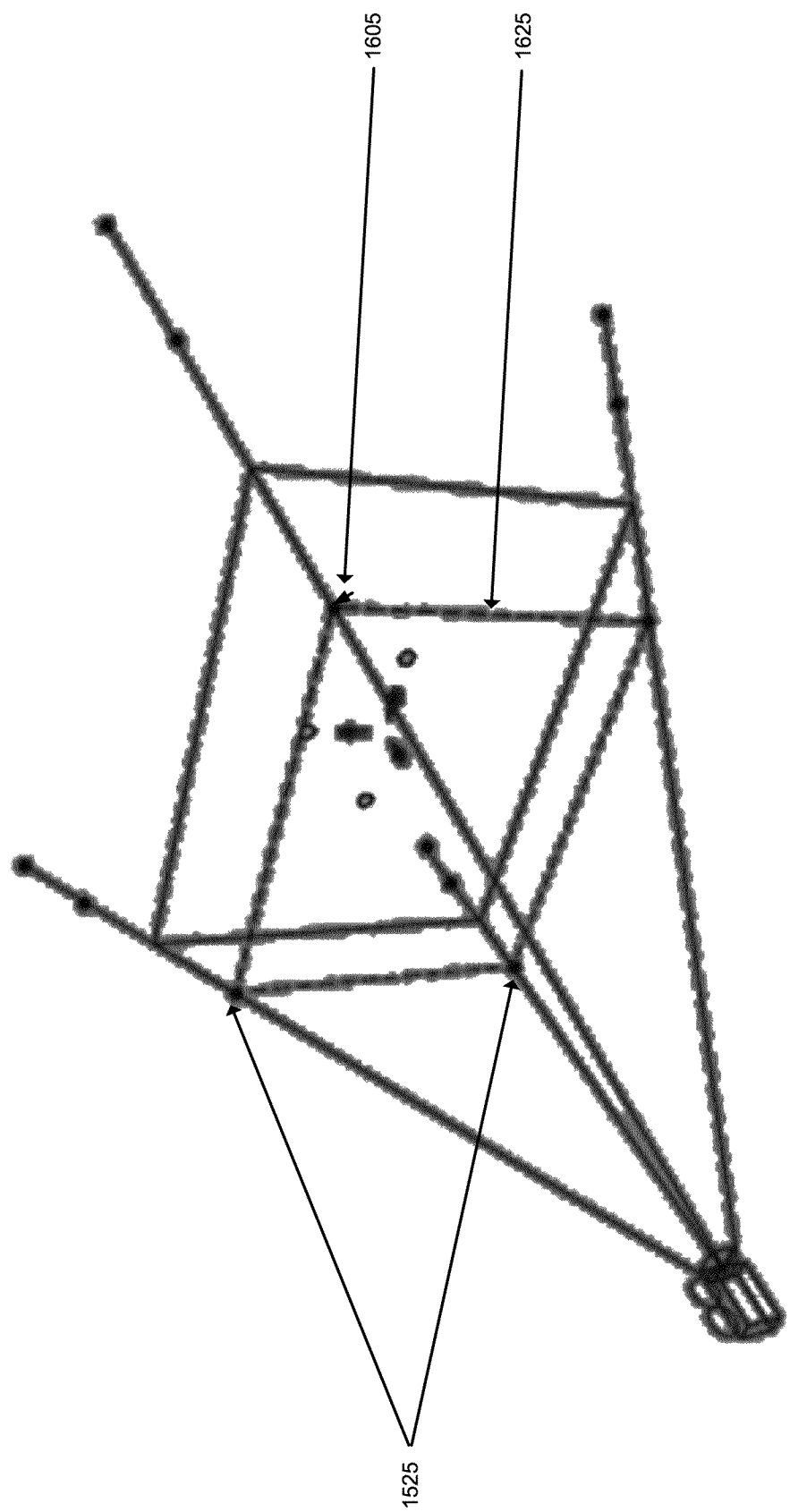

FIG. 16 illustrates a cursor 1605 over one of the near focus handles 1525. When a user selects the near focus handle 1525, near focus plane 1625 appears. In some embodiments, the near focus plane 1625 only appears when one of the near focus handles 1525 is selected. The user can then drag the near focus plane 1625 either closer to or further from the virtual camera 1505. Selecting one of the handles 1525 and dragging the plane 1625 causes all four handles 1525 to move in some embodiments.

Figure 17:
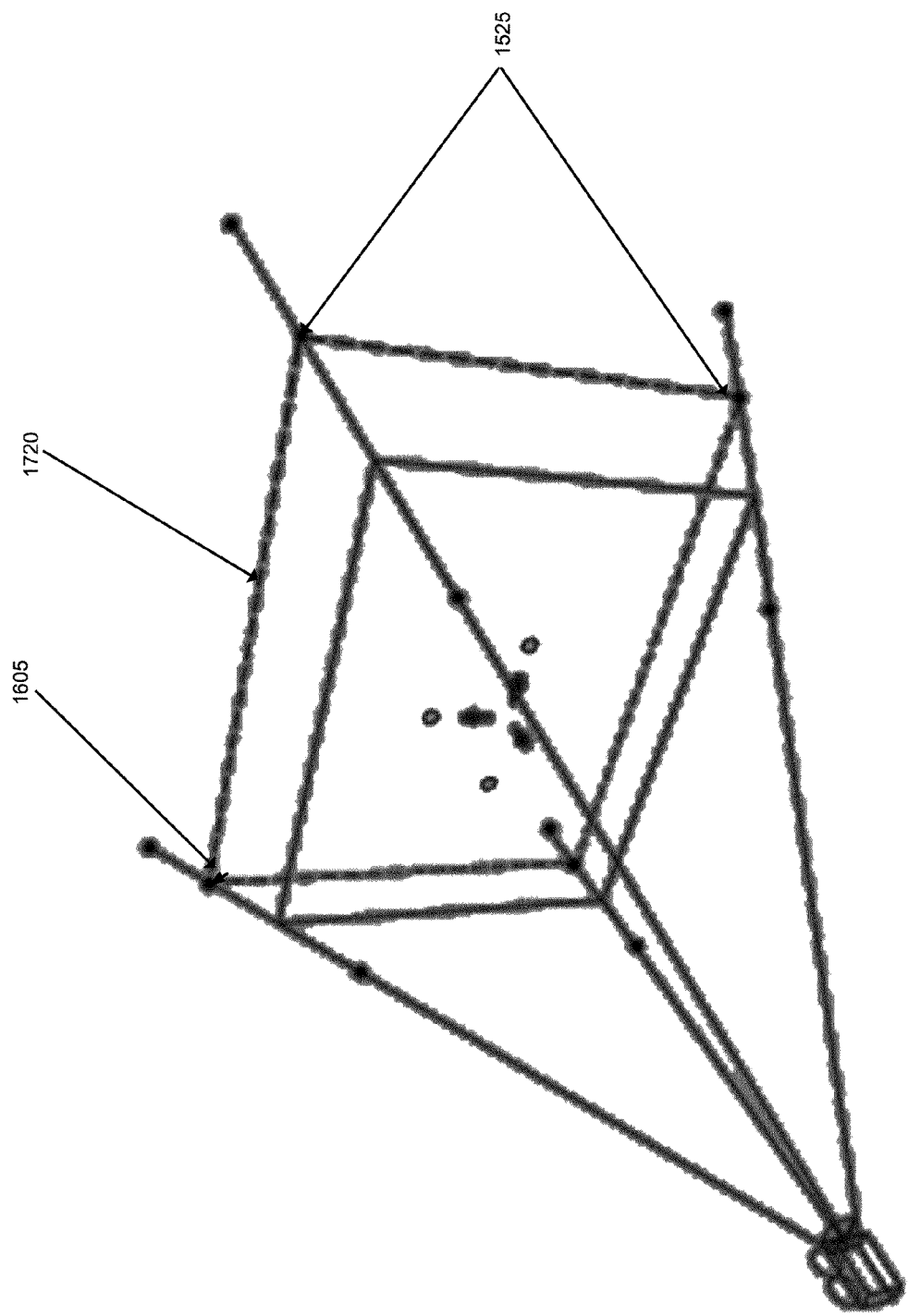

FIG. 17 illustrates the cursor 1605 over one of the focus offset handles 1520. When a user selects the focus offset handle 1520, focus offset plane 1720 appears. In some embodiments, the focus offset plane 1720 only appears when one of the focus offset handles 1520 is selected. The user can then drag the focus offset plane 1720 either closer to or further from the virtual camera 1505. Selecting one of the handles 1520 and dragging the plane 1720 causes all four handles 1520 to move in some embodiments.

Figure 18:
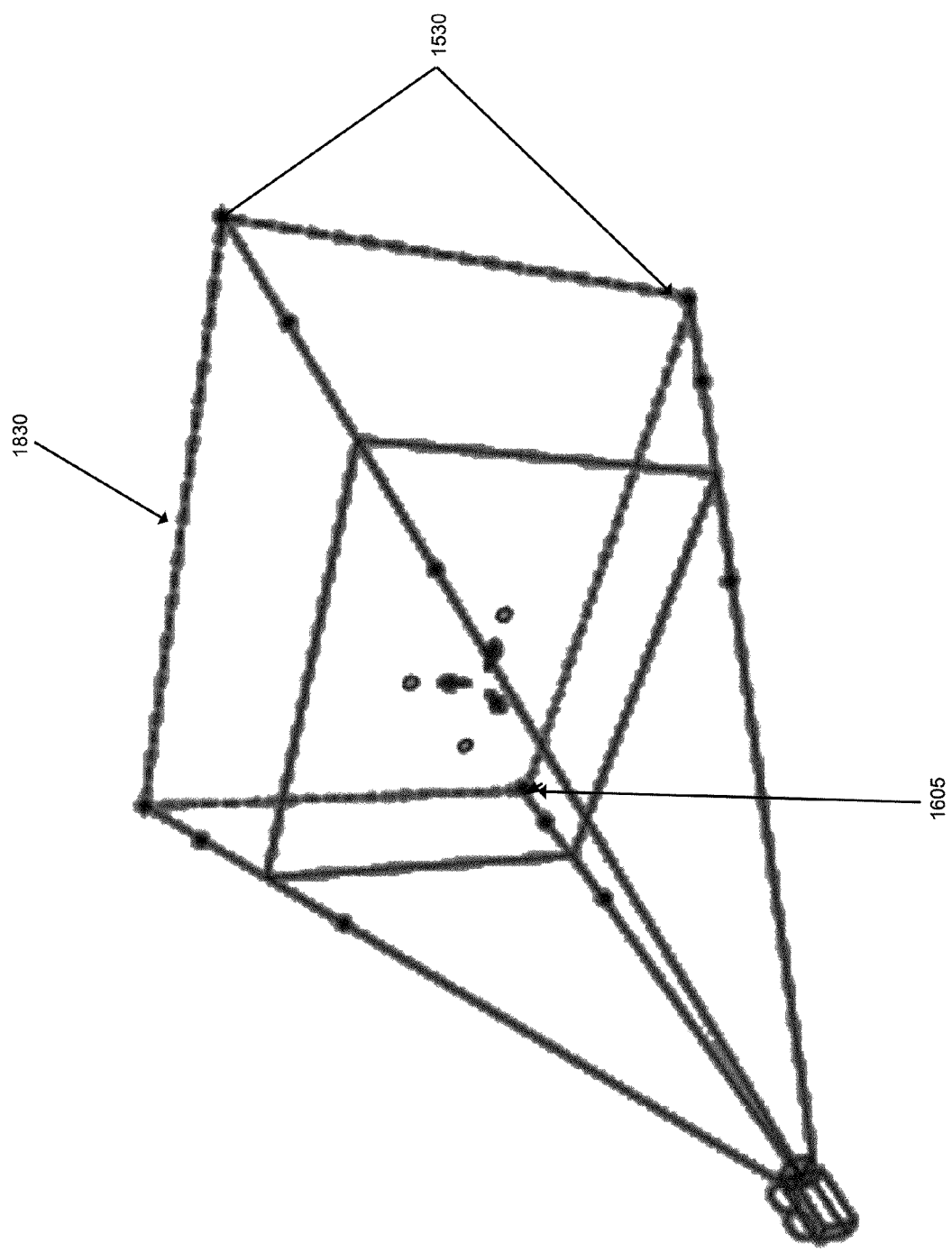

FIG. 18 illustrates the cursor 1605 over one of the far focus handles 1530. When a user selects the far focus handle 1530, far focus plane 1830 appears. In some embodiments, the far focus plane 1830 only appears when one of the far focus handles 1530 is selected. The user can then drag the far focus plane either closer to or further from the virtual camera 1505. Selecting one of the handles 1530 and dragging the plane 1630 causes all four handles 1530 to move in some embodiments.

Some embodiments incorporate the handles shown in FIG. 15 into a compositing application such as that illustrated in FIG. 8A, along with other controls to affect depth of field parameters such as sliders 831-834 and other inputs. In some such embodiments, the sliders and other inputs are affected by the movement of the handles in the same way as they are affected by movement of the depth of field planes, described above.

B. Rendering Changes in Depth of Field Parameters Over Time

Some embodiments enable a user to set the depth of field parameters of a virtual camera to change over a determined duration. A user can input a starting set of depth of field parameters and a finishing set of depth of field parameters, as well as a duration (e.g., length of time, number of frames of video, etc.) over which the parameters will change. In some embodiments, the user can input the starting and finishing sets of depth of field parameters with the user interface items (sliders, dragging planes or handles along the camera frustum, numerical input) described above.

When the scene portrayed by the virtual camera is rendered, the depth of field parameters change over the determined duration, from the starting parameters to the finishing parameters. For example, a user could set the parameters such that the focus offset and near and far focus would start as shown in FIG. 8, in which all three parameters are set to zero (only one plane is in focus, and it is at the physical focal plane of the camera), and end as shown in FIG. 9 (in which the near and far focus planes are a substantial distance from the focal plane). When rendered as a video over the set duration, the video will start with all three objects blurry to some degree, and finish with objects 710 and 715 completely in focus and object 720 less blurry than at the start of the video.

Some embodiments enable a user to select a target object to be brought into focus over a set duration. The user, in some embodiments, can select the target object, the duration, and the method of transition (e.g., constant movement of focus offset, accelerated movement of focus offset, etc.). When rendered, the apparent focal distance of the camera (i.e., the distance at which objects are in focus) will move from an initial distance to the distance of the target object, such that the target object is in focus at the end of the set duration.

Figure 19:
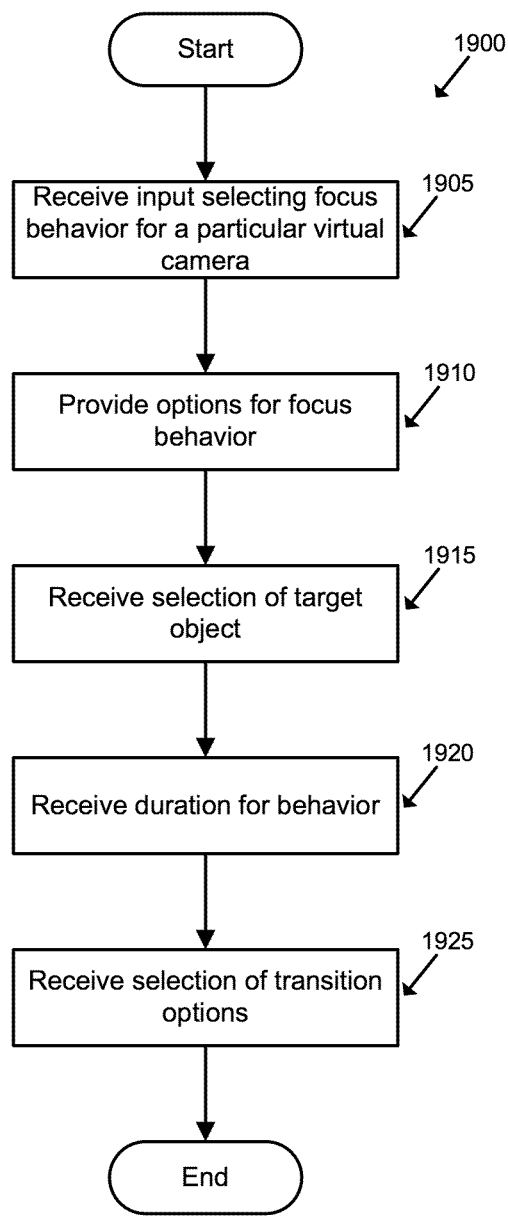
FIG. 19 conceptually illustrates a process of some embodiments for defining a change in depth of field parameters in order to bring a particular object into focus over a set duration.

FIG. 19 conceptually illustrates a process 1900 of some embodiments for defining a change in depth of field parameters in order to bring a particular object into focus over a set duration. The process 1900 starts when input is received (at 1905) selecting a focus behavior for a particular virtual camera.

Figure 20:
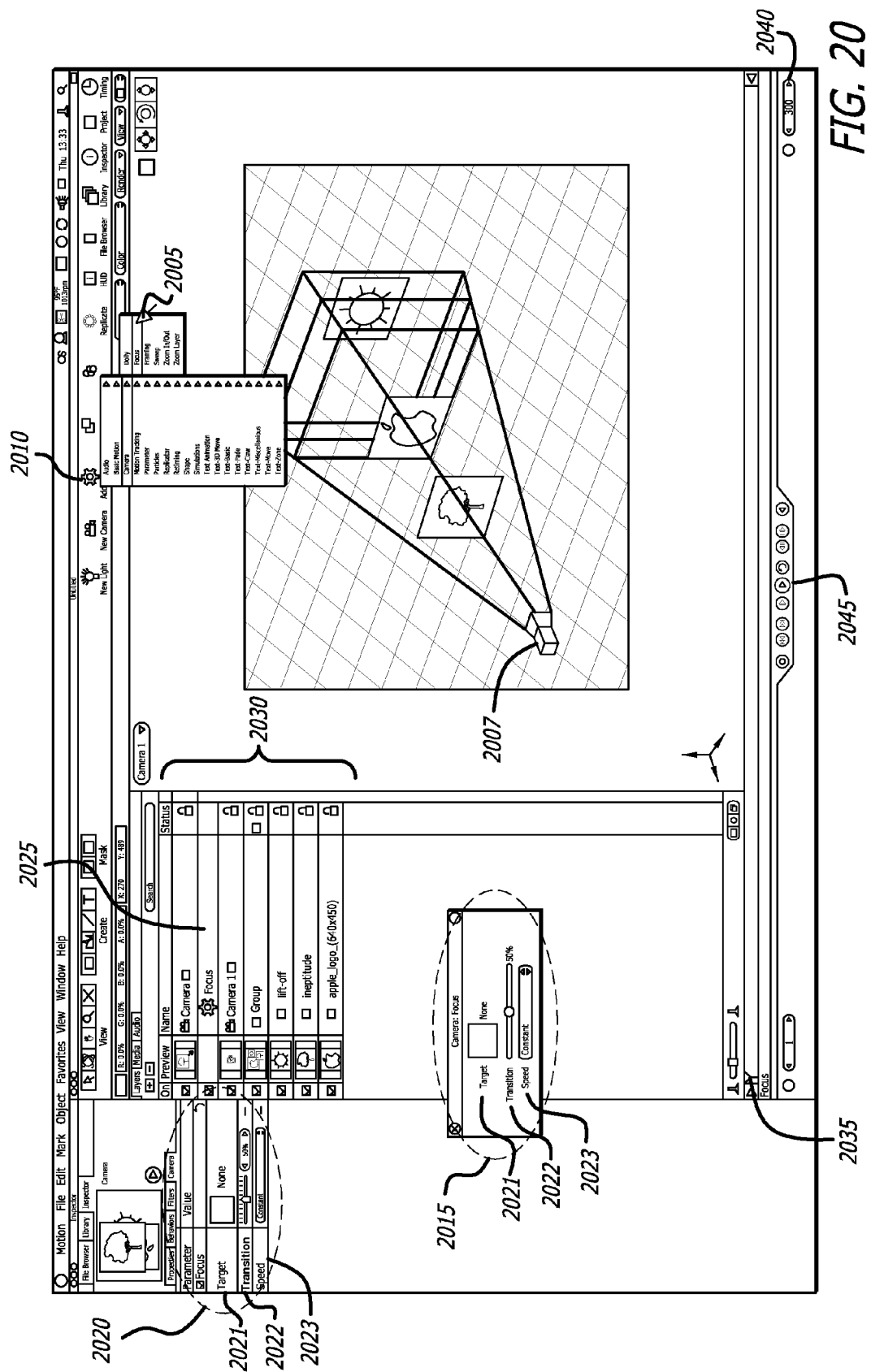
FIGS. 20-22 illustrate the selection of a target object to be brought into focus in a compositing application of some embodiments.

FIG. 20 illustrates a compositing application 2000. A user has selected a focus behavior with a cursor 2005 to associate with virtual camera 2007. In some embodiments, in order to select a focus behavior, a user selects the behavior icon 2010 (see also icon 427 of FIG. 4). The behavior icon of some embodiments provides a drop-down menu (or other menu) with various types of behaviors that a user can select. For example, behavior icon 2010 includes basic motion behaviors, camera behaviors, as well as other behaviors. In some embodiments, camera behaviors enable a user to change parameters of a camera over a set duration (e.g., depth of field parameters, camera location and direction, etc.). In some embodiments, such as the embodiment depicted, a user can select a "focus" menu option that allows the user to choose an object to bring into focus over a set duration.

After receiving the selection of a focus behavior for a particular virtual camera, the process 1900 provides (at 1910) options for the focus behavior. FIG. 20 illustrates that two sets of controls are provided, a moveable set of controls 2015 and a fixed set of controls 2020. In the depicted embodiment, each of the two sets of controls 2015 and 2020 provides three user interface items with which a user can interact in order to define the camera focus behavior. FIG. 20 illustrates a target user interface item 2021 that indicates a target object of the behavior (that is, the object upon which the camera will focus), a slider 2022 to set the transition time of the behavior (that is, to select when during the overall duration of the behavior the object will be brought into focus), and a drop-down menu 2023 with which a user can select the transition method (how the focal plane will move from its starting position to the target object).

Selecting a focus behavior also causes the provision of an object 2030 for the focus behavior in the object selection area 2025. The focus behavior object 2030 is a sub-object of the camera with which it is associated. In some embodiments, after initially entering settings for the focus behavior, a user can select the focus behavior object 2030 in order to bring up the behavior controls 2015 and 2020 so that the settings can be adjusted.

Figure 21:
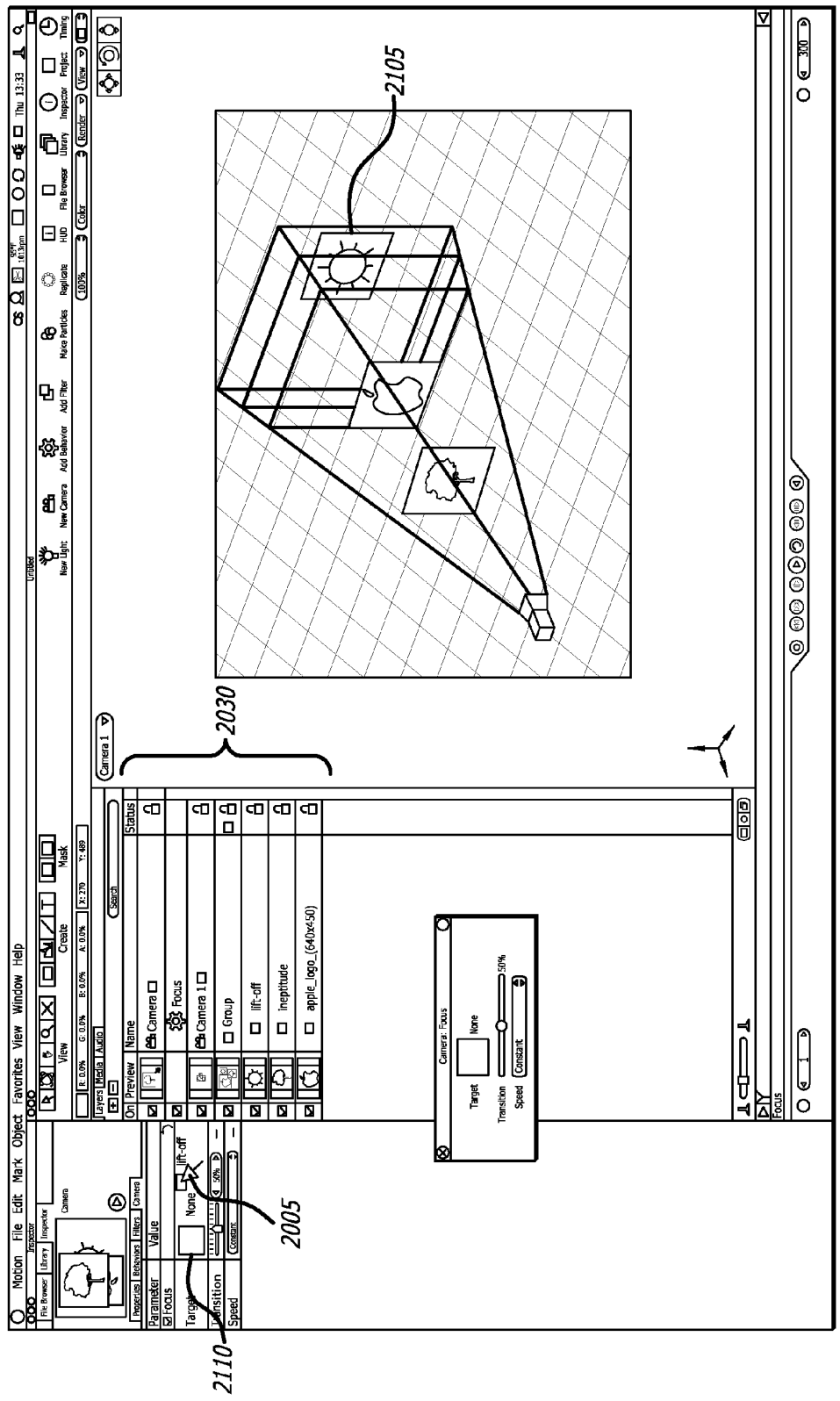
Figure 22:
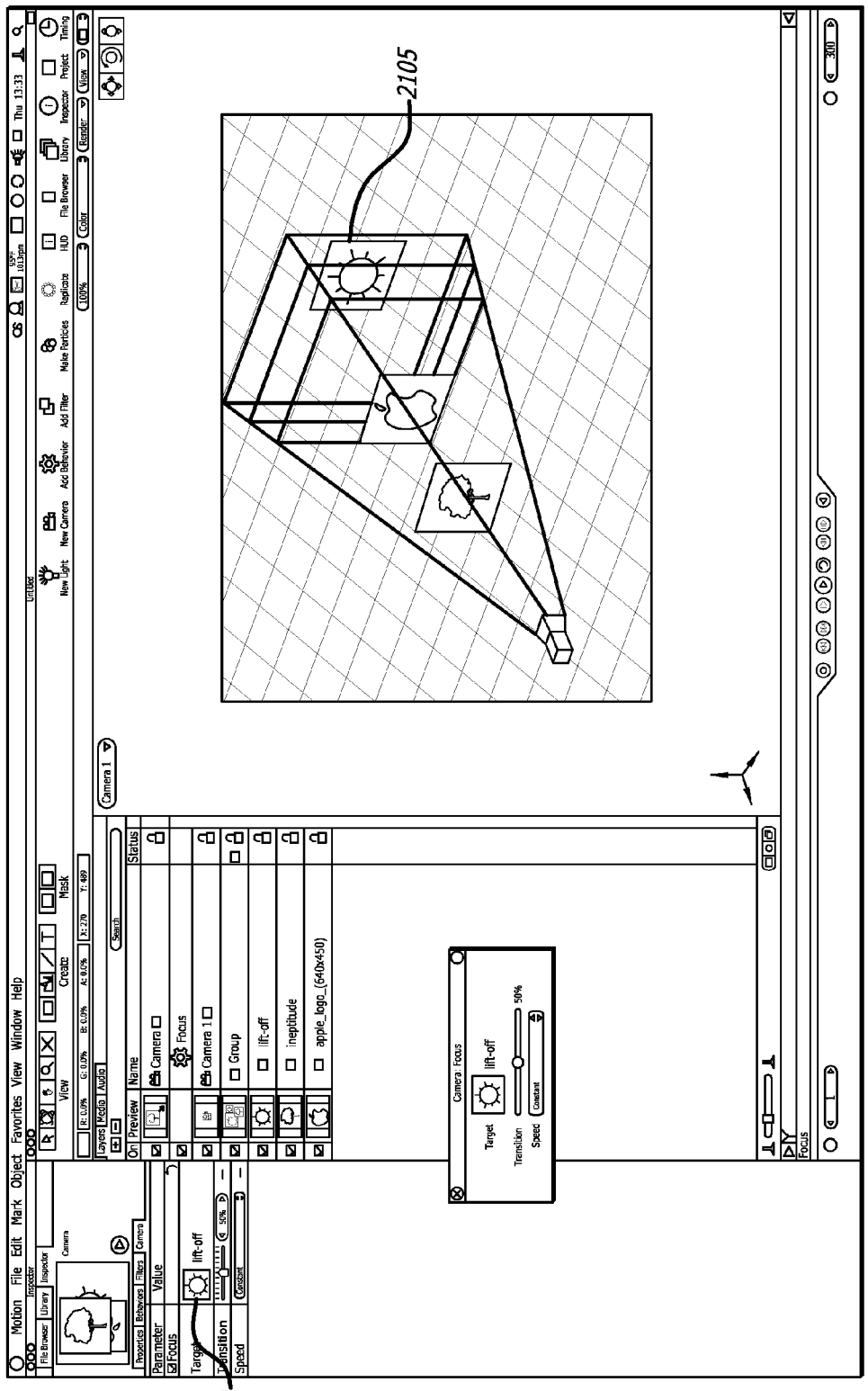

At 1915, the process 1900 receives a selection of a target object. FIGS. 21 and 22 illustrate the selection of object 2105 as the target object for the selected focus camera behavior. FIG. 21 illustrates a user dragging object 2105 with cursor 2005 into the target box 2110. In some embodiments, the user clicks on the object from the object selection area 2030 and drags it into target box 2110 in order to select the object as the object upon which the camera will focus. In some embodiments, a user can select the object in the display view in order to move the object into the target box. Other embodiments use different methods of selecting an object (e.g., methods that do not use a target box as depicted in FIG. 21).

In some embodiments, the target object may be either within the field of view of the camera or not within the field of view of the camera. If the object is not within the field of view of the camera, then in some embodiments, the behavior will move the focal plane to the distance of the target object. Some embodiments do not allow the target object to be out of the field of view of the camera. Other embodiments allow the target object to be out of the field of view, but rotate the camera during the behavior so that the object is within the field of view.

FIG. 22 illustrates the compositing application after the object 2105 has been successfully dragged into target box 2110. A small version of the object 2105 is displayed in the target box 2110 (and in the target box in the moveable set of controls 2015), and the name of the object ("lift-off", for object 2105) is displayed next to both target boxes. This indicates that at the end of the duration for the behavior, the apparent focal plane of the camera will be located at the depth of the selected object 2105.

At 1920, the process receives a duration for the behavior. Different embodiments provide different user interface tools for a user to set the duration. In some embodiments, a window pops up when a user selects a focus behavior, asking the user to input a duration for the behavior. In some embodiments, a user adjusts timeline 2035 located below the display area to set the duration for the behavior. In FIG. 20, timeline 2035 is set for 300 frames, the entirety of the scene. In some embodiments, a user can select the end of the timeline 2035 and drag it left or right to set the duration for the behavior. The starting point for the behavior can also be changed by dragging the left end of the timeline to the right, such that the behavior does not begin at the start of the scene. The scene length can be changed in some embodiments by altering the number of frames using user interface item 2040.

At 1925, the process receives a selection of transition options. In some embodiments, these are the transition time and transition method. In FIG. 20, either transition time slider 2022 can be used to set the percentage of the overall duration (set at 1920) during which the focal plane will actually be moving between its initial distance and the distance of the target object. In some embodiments, the transition time can also be input directly as a numerical percentage value, as shown in controls 2020, or with other user interface tools.

FIG. 20 also illustrates drop-down menus 2023 labeled "speed", each of which allows the selection of a transition method that defines how the focal plane moves from its initial position to the target object. In some embodiments, the different options include at least one of constant (the focal plane moves at a uniform speed), ease in (the focal plane starts slowly and works up to a uniform speed), ease out (the focal plane starts at a uniform speed and slows down as it approaches the target object, ease in and out (a combination of the two above), accelerate (the focal plane moves at an increasing velocity until reaching the target object), and decelerate (the focal plane moves at a decreasing velocity until reaching the target object). After 1925, the process has received all the information to define the behavior, and therefore ends.

In the process 1900, the process receives a selection of a target object, then a duration for the behavior, then the selection of transition options. In some embodiments, the order in which these are received is different. For instance, in some embodiments a user will input the duration before selecting a target object, or will input the transition options prior to either inputting the duration or selecting the target object. Furthermore, in some embodiments, the user can edit these options afterwards to redefine the behavior. For example, a user can modify the transition method if, after rendering the scene that includes the behavior, the user decides that the focal offset should move in a different way from the initial position to the target object. Some embodiments even allow a user to modify the transition options while rendering the scene.

In some embodiments, a user can render a scene including a focus behavior (e.g., by clicking on the play button 2045). Some embodiments render the entire scene, even if the behavior has a duration less than the length of the time. Some embodiments also enable a user to only render the scene for the duration of the behavior rather than for the length of the entire scene (e.g., with a play button specific to the behavior timeline 2035).

Figure 23:
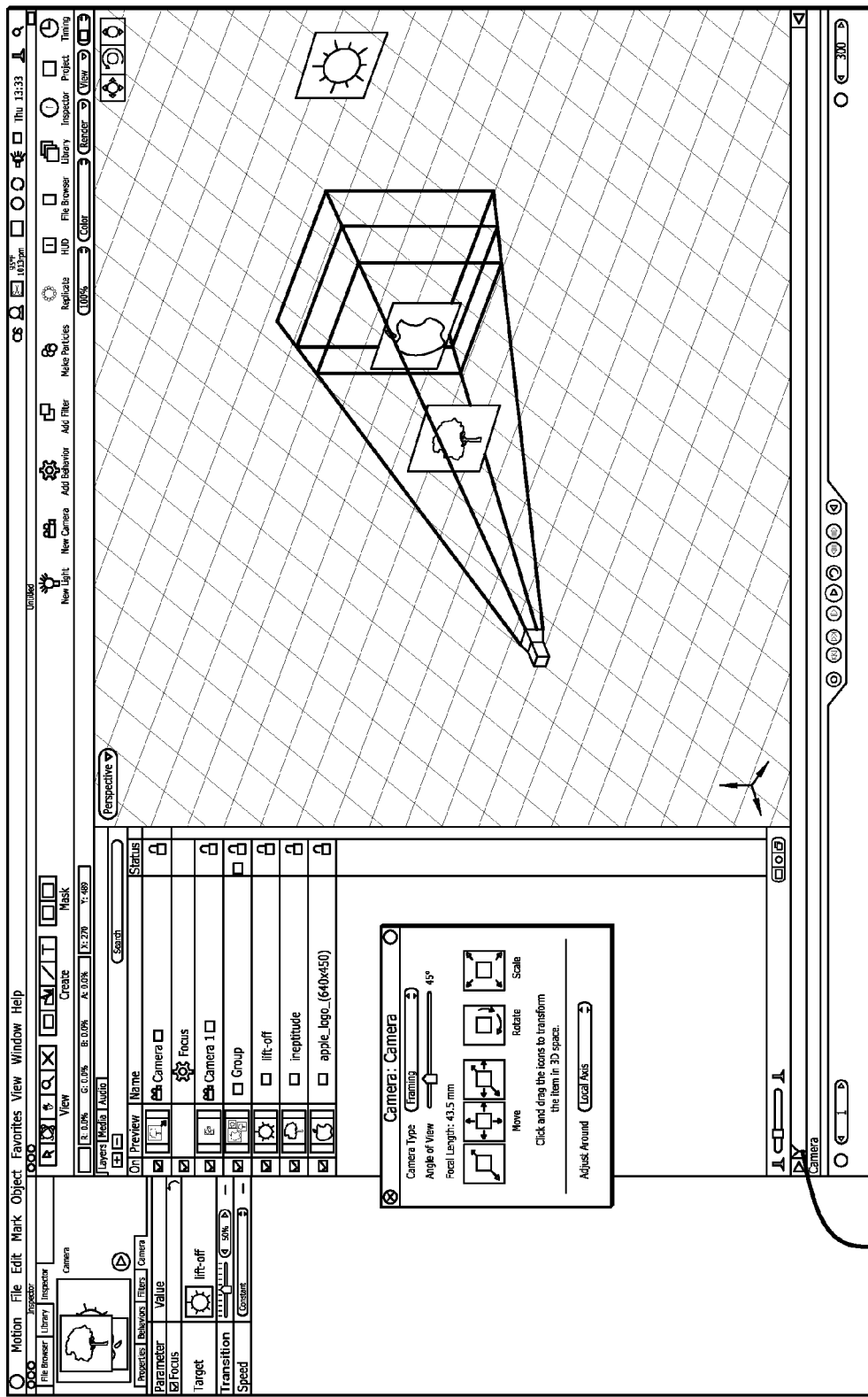
FIG. 23 illustrates a perspective view of the first frame of a focus behavior of some embodiments.
Figure 24:
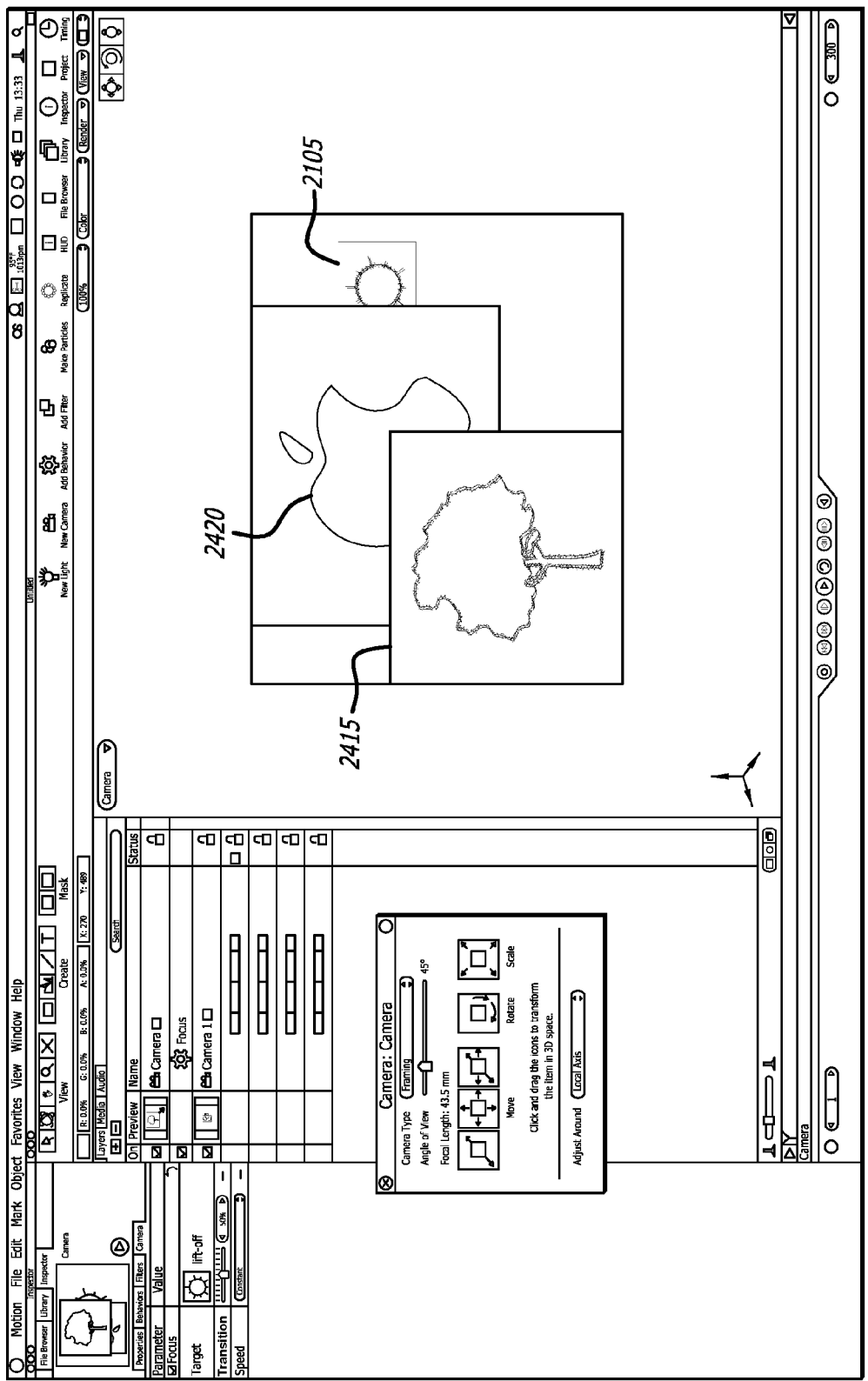
FIG. 24 illustrates a view rendered from a virtual camera of the first frame of the focus behavior.

FIG. 23 illustrates a perspective view of the scene from FIG. 20 at frame 1, with the apparent focal plane at its initial position. In some embodiments, a user can select and drag time mark 2310 to move throughout the scene. In FIG. 23, time mark 2310 is at the start of the scene, frame 1. FIG. 24 illustrates the rendered view at frame 1 from the virtual camera 2007. As can be seen in FIG. 24, objects 2105 (the target object) and 2415 are blurry, whereas object 2420 is in focus.

Figure 25:
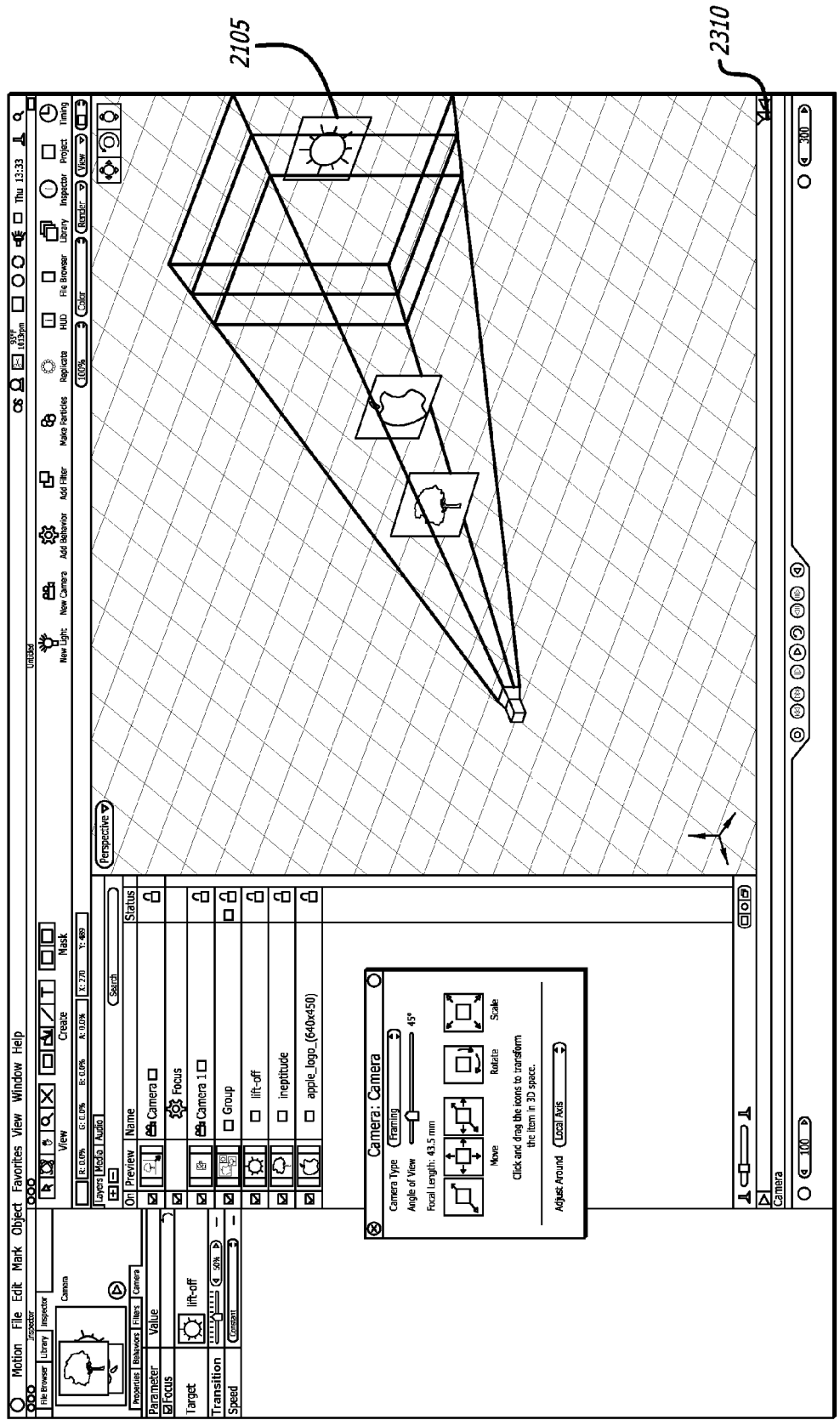
FIG. 25 illustrates a perspective view of the last frame of the focus behavior.
Figure 26:
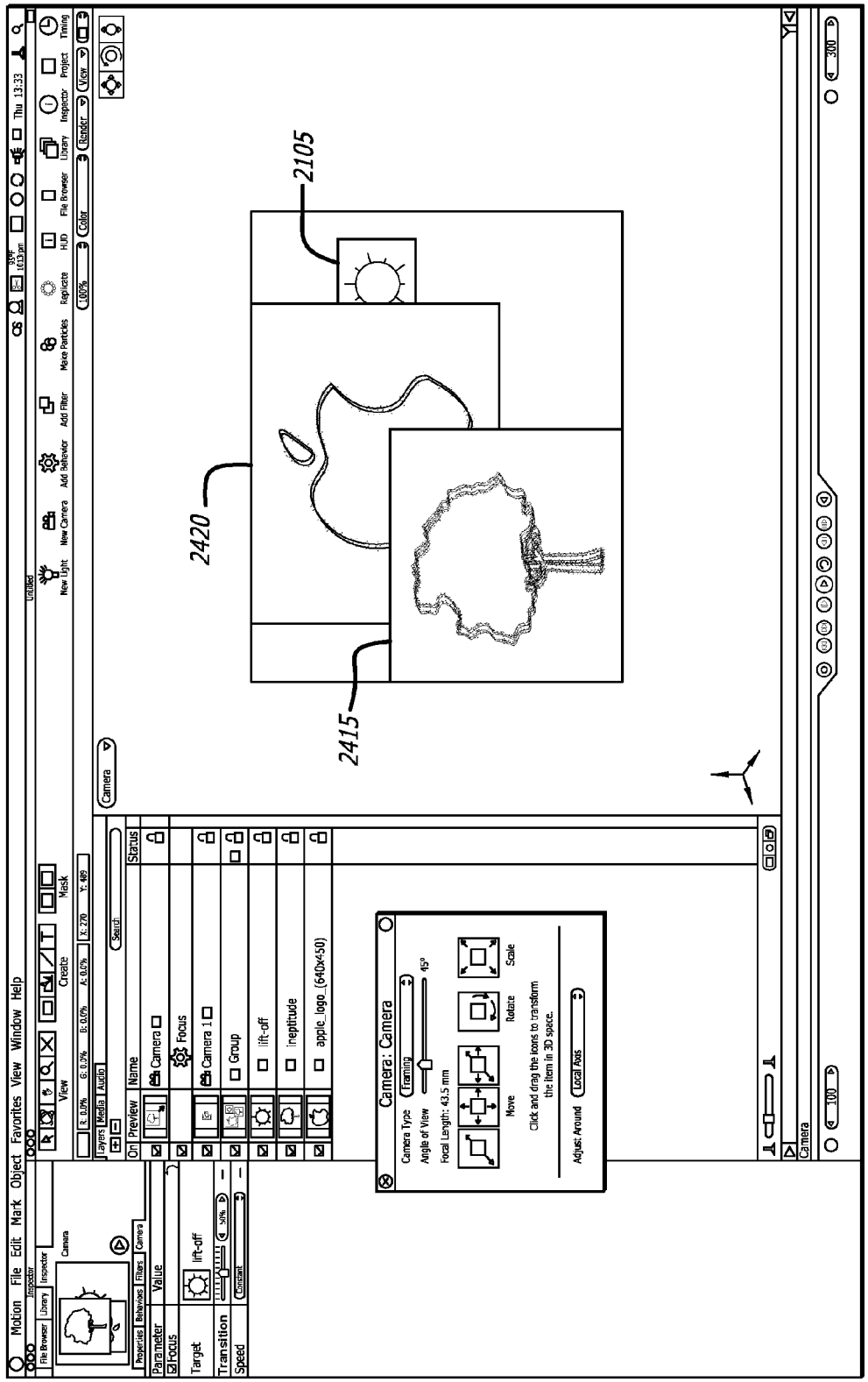
FIG. 26 illustrates a view rendered from the virtual camera of the last frame of the focus behavior.

FIG. 25 illustrates a perspective view of the scene at frame 300 (the final frame in the scene). Time mark 2310 has been moved to the end of the timeline (either by the application playing the entire scene, or by a user dragging the mark to the end of the timeline). The focus offset plane is now at the distance of the target object, object 2105, and the near focus and far focus planes have moved along with the focus offset plane. In some embodiments, the distances of the near and far focus planes from the focus offset plane stay constant. In other embodiments, the distances vary as the percentages (defined by the sliders as described above) stay constant. FIG. 26 illustrates the rendered view at frame 300 from the virtual camera 2007. As compared to the view at frame 1 (FIG. 24), object 2415 is even blurrier, object 2105 has become blurry, and object 2420 is now in focus.

While the described embodiments uses a behavior to move the focus offset (apparent focal plane) to a target object, some embodiments allow for other behaviors to be specified. For example, in some embodiments, an object can be selected such that the object will be brought to the focal plane of a virtual camera over a set duration. Some embodiments allow a user to specify a behavior that moves the near or far focus plane such that a target object is brought into the region of focus.

IV. Software Architecture

Figure 27:
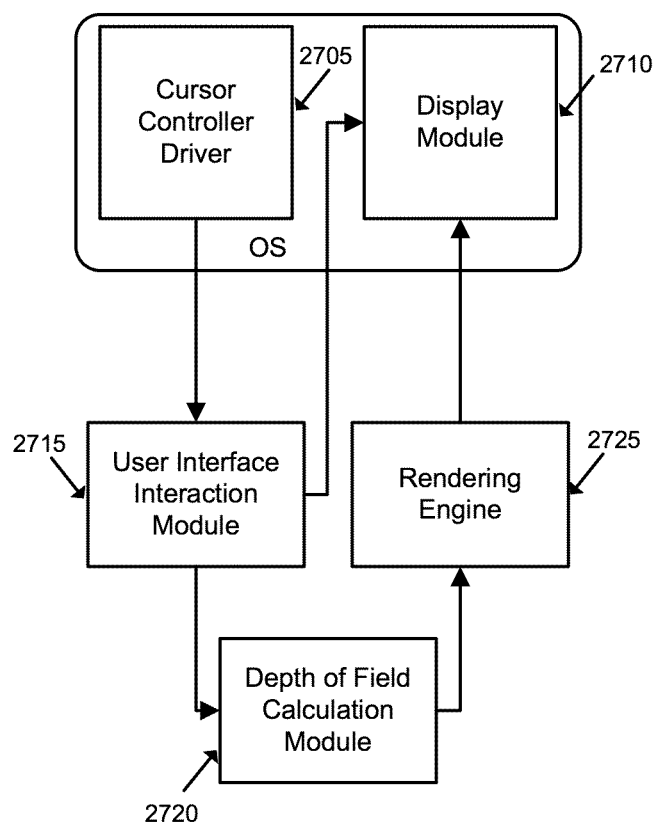
FIG. 27 conceptually illustrates the software architecture of some embodiments of the compositing application.

In some embodiments, the compositing application described above is implemented as a set of modules. FIG. 27 conceptually illustrates the software architecture of some embodiments of the compositing application. In some embodiments, the compositing application is a stand-alone application or is integrated into another application, while in other embodiments the application might be implemented within an operating system. FIG. 27 illustrates a cursor driver 2705, a display module 2710, a user interface (UI) interaction module 2715, a depth of field calculation module 2720, and a rendering engine 2725.

In some embodiments, as illustrated, the cursor driver and/or display module are part of an operating system 2730 even when the compositing application is a stand-alone application separate from the operating system. The UI interaction module 2715 generates user interface items, such as the depth of field sliders and planes described above, and determines how they should be displayed within the compositing application. The UI interaction module 2715 passes this information to the display module 2710, which enables the display of the compositing application, including the user interface items, on a computer monitor or other such display device (not shown).

A user interacts with the user interface items via input devices (not shown). The input devices, such as cursor controllers, send signals to the cursor controller driver 2705, which translates those signals into user input data that is provided to the UI interaction module 2715. The UI interaction module 2715 uses the user input data to modify the displayed user interface items. For example, if a user drags a cursor along a near focus slider, the UI interaction module 2715 will instruct the display module to move the slider on the display, and to move the near focus plane as well. The UI interaction module 2715 also passes data on user interactions affecting depth of field parameters to the depth of field (DOF) calculation module 2720.

DOF calculation module 2720 calculates how in focus or blurry objects should appear when rendered. The DOF calculation module 2720 bases this information on the distances of the objects from a particular virtual camera, depth of field parameters (e.g., focal plane of the virtual camera, aperture, focus offset, near and far focus distances) for the virtual camera, the blurring algorithm selected, etc. In some embodiments, the DOF calculation module is one of a number of modules that apply special effects (i.e., any effect applied to a region in a space that modifies the appearance of the affected region, such as blurring or coloring effects) to a region within the field of view of the virtual camera.

The DOF calculation module 2720 passes the DOF calculations to the rendering engine 2725. The rendering engine 2725 enables the output of audio and video from the compositing application. The rendering engine 2725, based on information from the DOF calculation module 2720 and other modules (not shown), sends information about how to display each pixel of a scene to the display module 2710.

While many of the features have been described as being performed by one module (e.g., the UI interaction module 2715 or DOF calculation module C320), one of ordinary skill would recognize that the functions might be split up into multiple modules, and the performance of one feature might even require multiple modules.

V. Computer System

Figure 28:
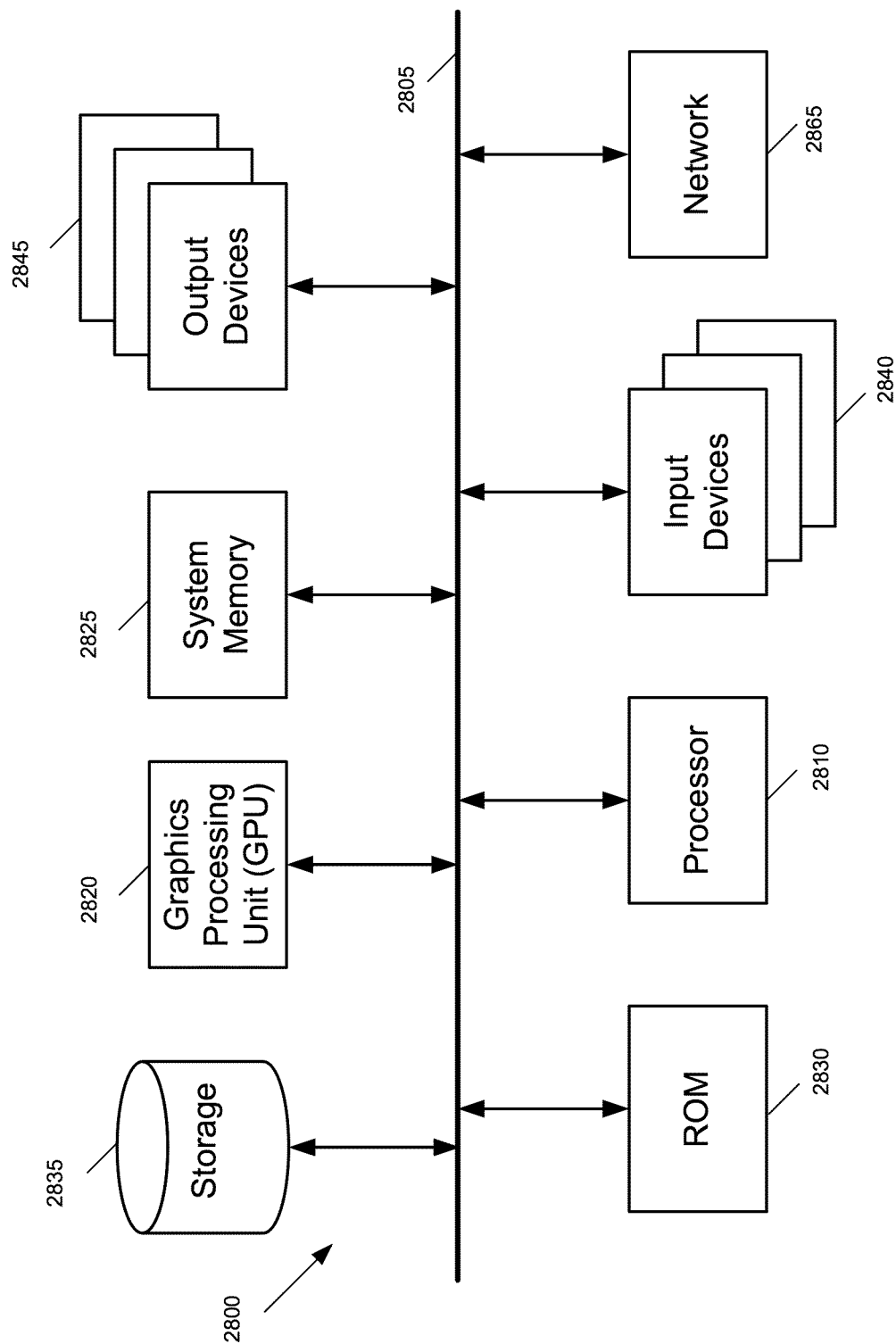
FIG. 28 conceptually illustrates a computer system with which some embodiments of the invention are implemented.

Computer programs for implementing some embodiments are executed on computer systems. FIG. 28 illustrates a computer system with which some embodiments of the invention are implemented. Such a computer system includes various types of computer readable media and interfaces for various other types of computer readable media. Computer system 2800 includes a bus 2805, a processor 2810, a graphics processing unit (GPU) 2820, a system memory 2825, a read-only memory 2830, a permanent storage device 2835, input devices 2840, and output devices 2845.

The bus 2805 collectively represents all system, peripheral, and chipset buses that communicatively connect the numerous internal devices of the computer system 2800. For instance, the bus 2805 communicatively connects the processor 2810 with the read-only memory 2830, the GPU 2820, the system memory 2825, and the permanent storage device 2835.

From these various memory units, the processor 2810 retrieves instructions to execute and data to process in order to execute the processes of the invention. Some instructions are passed to and executed by the GPU 2820. The GPU 2820 can offload various computations or complement the image processing provided by the processor 2810. In some embodiments, such functionality can be provided using CoreImage's kernel shading language.

The read-only-memory (ROM) 2830 stores static data and instructions that are needed by the processor 2810 and other modules of the computer system. The permanent storage device 2835, on the other hand, is a read-and-write memory device. This device is a non-volatile memory unit that stores instructions and data even when the computer system 2800 is off. Some embodiments of the invention use a mass-storage device (such as a magnetic or optical disk and its corresponding disk drive) as the permanent storage device 2835.

Other embodiments use a removable storage device (such as a floppy disk, flash drive, or ZIP® disk, and its corresponding disk drive) as the permanent storage device. Like the permanent storage device 2835, the system memory 2825 is a read-and-write memory device. However, unlike storage device 2835, the system memory is a volatile read-and-write memory, such a random access memory. The system memory stores some of the instructions and data that the processor needs at runtime. In some embodiments, the invention's processes are stored in the system memory 2825, the permanent storage device 2835, and/or the read-only memory 2830.

The bus 2805 also connects to the input and output devices 2840 and 2845. The input devices enable the user to communicate information and select commands to the computer system. The input devices 2840 include alphanumeric keyboards and pointing devices (also called "cursor control devices"). The output devices 2845 display images generated by the computer system. For instance, these devices display a GUI. The output devices include printers and display devices, such as cathode ray tubes (CRT) or liquid crystal displays (LCD).

Finally, as shown in FIG. 28, bus 2805 also couples computer 2800 to a network 2865 through a network adapter (not shown). In this manner, the computer can be a part of a network of computers (such as a local area network ("LAN"), a wide area network ("WAN"), or an Intranet, or a network of networks, such as the internet. For example, the computer 2800 may be coupled to a web server (network 2865) so that a web browser executing on the computer 2800 can interact with the web server as a user interacts with a GUI that operates in the web browser.

Any or all components of computer system 2800 may be used in conjunction with the invention. For instance, in some embodiments the execution of the frames of the rendering is performed by the GPU 2820 instead of the CPU 2810. Similarly, other image editing functions can be offloaded to the GPU 2820 where they are executed before the results are passed back into memory or the processor 2810. However, a common limitation of the GPU 2820 is the number of instructions that the GPU 2820 is able to store and process at any given time. Therefore, some embodiments adapt instructions for implementing processes so that these processes fit onto the instruction buffer of the GPU 2820 for execution locally on the GPU 2820. Additionally, some GPUs 2820 do not contain sufficient processing resources to execute the processes of some embodiments and therefore the CPU 2810 executes the instructions. One of ordinary skill in the art would appreciate that any other system configuration may also be used in conjunction with the present invention.

As mentioned above, the computer system 2800 may include any one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, and floppy disks.

While the invention has been described with reference to numerous specific details, one of ordinary skill in the art will recognize that the invention can be embodied in other specific forms without departing from the spirit of the invention. For example, the application of blurring effects to regions outside a region of focus has been described in detail, but other special effects (i.e., any effect applied to a region in a space that modifies the appearance of the affected region, such as blurring or coloring effects). Thus, one of ordinary skill in the art would understand that the invention is not to be limited by the foregoing illustrative details, but rather is to be defined by the appended claims.

We claim:

1. A method comprising:
   providing tools for defining a scene comprising media objects in a multidimensional space; and
   providing a set of user interface tools for adjusting a region of focus for rendering the space from a particular location within a particular field of view, wherein the region of focus is modifiable, based at least in part on a set of depth of field parameters comprising at least one of a focus offset, a near focus, and a far focus, and further wherein at least one of the focus offset, the near focus and the far focus define a boundary of the region of focus, to adjust whether the media objects are rendered in focus.

2. The method of claim 1, wherein the region of focus is a plane in the particular field of view in which the media objects are rendered in focus.

3. The method of claim 1, wherein the region of focus is a three-dimensional volume within the particular field of view in which the media objects are rendered in focus.

4. The method of claim 1, wherein the region of focus is a first region in the space within the particular field of view, wherein the space further includes a second region outside of the region of focus within the particular field of view, the method further comprising providing a set of effects for applying to the second region but not the first region to visually indicate the first region as the region of focus within the space and the second region as a region outside of the region of focus within the space.

5. The method of claim 1, wherein the set of user interface tools comprises a tool for modifying the distance of the region of focus from the particular location.

6. The method of claim 1, wherein the set of user interface tools comprises a set of tools for modifying a size of the region of focus.

7. The method of claim 1, wherein blurring effects are applied to media objects within the particular field of view and outside the region of focus.

8. The method of claim 7 further comprising providing user interface tools for modifying the blurring effects.

9. The method of claim 1, wherein the set of user interface tools for adjusting the region of focus comprises slider tools.

10. The method of claim 1, wherein the set of user interface tools for adjusting the region of focus comprises tools for direct numerical input of parameters affecting the region of focus.

11. The method of claim 1, further comprising providing an indication of the region of focus within the scene.

12. The method of claim 1, wherein the multi-dimensional space is a multi-dimensional space of a media-editing application.

13. The method of claim 1, wherein the region of focus is for rendering the space in a particular direction.

14. A method comprising:
   providing a display area for displaying a scene comprising media objects in a media-editing application; and
   providing a user interface (UI) tool within the display area to represent a particular location, a particular orientation, and a particular field of view from which to render the scene; and
   providing tools within the display area for indicating a region of focus for rendering the scene, wherein the region of focus is modifiable, based at least in part on a set of depth of field parameters comprising at least one of a focus offset, a near focus, and a far focus, and further wherein at least one of the focus offset, the near focus and the far focus define a boundary of the region of focus, to adjust whether the media objects are rendered in focus.

15. The method of claim 14, wherein the tools for indicating the region of focus are planes within the field of view.

16. The method of claim 15, wherein the planes are provided along a frustum of a camera user interface tool and wherein dragging the planes along the frustum modifies the region of focus.

17. The method of claim 14, wherein the UI tool for representing the particular location, orientation, and field of view from which to render the scene is a camera UI tool, the method further comprising:
 providing a tool for receiving a command to modify one or more of the set of depth of field parameters of the camera user interface tool over a set duration;
 providing a tool for rendering a video of the scene, from a perspective of a virtual camera at the particular location, orientation, and field of view, in which the one or more of the set of depth of field parameters is modified in accordance with the command.

18. The method of claim 17, wherein the tool for receiving the command is further for receiving a selection of a target object to render in focus at an end of the set duration.

19. The method of claim 17, wherein the command is a first command and the tool for receiving the first command is further for receiving a second command to expand a region of focus of the virtual camera.

20. A non-transitory machine readable medium storing a program for execution by at least one processing unit, the program comprising:
 a set of instructions for displaying (i) a scene comprising media objects in a multidimensional space and (ii) a set of user interface tools for determining a region of focus for rendering the multi-dimensional space, wherein the set of user interface tools comprises a pair of planes that define the region of focus, and further wherein the region of focus is modifiable, based at least in part on a set of depth of field parameters comprising at least one of a focus offset, a near focus, and a far focus, and further wherein at least one of the focus offset, the near focus and the far focus define a boundary of the region of focus, to adjust whether the media objects are rendered in focus; and
 a set of instructions for receiving an adjustment of one of the pair of planes that define the region of focus;
 a set of instructions for, based on the adjustment of the plane, adjusting a size of the region of focus for the rendering of the multi-dimensional space.

21. The non-transitory machine readable medium of claim 20, wherein the program further comprises a set of instructions for blurring a media object that is outside the region of focus.

22. The non-transitory machine readable medium of claim 20, wherein the user interface tools comprise a first plane that is a near focus control and a second plane that is a far focus control.

23. A non-transitory machine readable medium storing a program for execution by at least one processing unit, the program comprising a set of instructions that when executed result in operations comprising:
 displaying (i) a scene comprising media objects in a media-editing application and (ii) a user interface (UI) tool that represents a particular location, a particular orientation, and a particular field of view from which to render the scene;
 displaying, in the display area, a set of tools for indicating a region of focus for rendering the scene from the perspective of the UI tool, wherein the set of tools comprises a first plane that defines a front of the region of focus and a second plane that defines a back of the region of focus, and further wherein the region of focus is modifiable, based at least in part on a set of depth of field parameters comprising at least one of a focus offset, a near focus, and a far focus, and further wherein at least one of the focus offset, the near focus and the far focus define a boundary of the region of focus, to adjust whether the media objects are rendered in focus; and
 rendering a set of virtual objects within the region of focus as in focus objects.

24. The non-transitory machine readable medium of claim 23, wherein the operations further comprise rendering a set of virtual objects outside the region of focus as out of focus objects.

25. The non-transitory machine readable medium of claim 23, wherein the operations further comprise (i) receiving input on a near focus control and (ii) moving the first plane according to said input.

26. The non-transitory machine readable medium of claim 23, wherein the user interface tool comprises a tool for modifying the distance of the region of focus from the particular location.

* * * * *